US006985929B1

(12) United States Patent
Wilson et al.

(10) Patent No.: US 6,985,929 B1
(45) Date of Patent: Jan. 10, 2006

(54) DISTRIBUTED OBJECT-ORIENTED GEOSPATIAL INFORMATION DISTRIBUTION SYSTEM AND METHOD THEREOF

(75) Inventors: Ruth Wilson, Picayune, MS (US); Miyi Chung, Terrytown, LA (US); Maria Cobb, Hattiesburg, MS (US); Kevin Shaw, Gulfport, MS (US); Roy Ladner, Slidell, LA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 584 days.

(21) Appl. No.: 09/653,413

(22) Filed: Aug. 31, 2000

(51) Int. Cl.
    *G06F 15/16* (2006.01)
(52) U.S. Cl. .................. 709/217; 709/219; 707/10; 701/200
(58) Field of Classification Search .............. 709/217, 709/219, 245, 203; 707/10; 701/208
    See application file for complete search history.

(56) References Cited

U.S. PATENT DOCUMENTS

| | | | | |
|---|---|---|---|---|
| 5,467,444 A | * | 11/1995 | Kawamura et al. | ......... 345/441 |
| 5,602,564 A | * | 2/1997 | Iwamura et al. | ............ 345/782 |
| 5,682,525 A | * | 10/1997 | Bouve et al. | ............ 707/104.1 |
| 5,737,533 A | * | 4/1998 | de Hond | .................... 709/219 |
| 5,809,145 A |  | 9/1998 | Slik et al. | |
| 5,852,810 A | * | 12/1998 | Sotiroff et al. | ................. 705/27 |
| 5,892,909 A |  | 4/1999 | Grasso et al. | .......... 395/200.31 |
| 5,930,474 A | * | 7/1999 | Dunworth et al. | .......... 709/217 |
| 5,946,687 A |  | 8/1999 | Gehani et al. | |
| 5,948,040 A |  | 9/1999 | DeLorme et al. | ........... 701/201 |
| 5,961,572 A |  | 10/1999 | Craport et al. | |
| 6,081,802 A |  | 6/2000 | Atherton et al. | |
| 6,083,353 A |  | 7/2000 | Alexander, Jr. | |
| 6,107,961 A | * | 8/2000 | Takagi | .................... 342/357.13 |
| 6,183,364 B1 | * | 2/2001 | Trovato | ....................... 463/32 |
| 6,229,546 B1 | * | 5/2001 | Lancaster et al. | ........... 345/419 |
| 6,240,369 B1 | * | 5/2001 | Foust | ............................. 702/3 |
| 6,285,317 B1 | * | 9/2001 | Ong | ...................... 342/357.13 |
| 6,321,158 B1 | * | 11/2001 | DeLorme et al. | ........... 701/201 |
| 6,336,074 B1 | * | 1/2002 | Woo | ........................... 701/208 |
| 6,381,603 B1 | * | 4/2002 | Chan et al. | .................... 707/10 |

(Continued)

FOREIGN PATENT DOCUMENTS

EP        1054354 A1  *  11/2000

OTHER PUBLICATIONS

Koller et al., "Virtual GIS: A Real-Time 3D Geographic Information System", GVU Technical Report GIT-GVU-95-14, Georgia Institute of Technology.*

(Continued)

*Primary Examiner*—Marc D. Thompson
*Assistant Examiner*—Joseph Maniwang
(74) *Attorney, Agent, or Firm*—John J. Karasek; Sally A. Ferrett

(57) ABSTRACT

A distributed object-oriented geospatial database system and method thereof over the Internet using Web-based technology to perform data-driven queries, such as retrieving, viewing and updating, geospatial data of the object oriented geospatial database, such as vector, raster, hypertext and multimedia data, including data types or formats of ESRI shape files, GSF, oceanographic ASCII text data by NAV-OCEANO and geospatial data with temporal information and supporting 3D display of the geospatial data. The object-oriented geospatial database system is implemented in a heterogeneous object-oriented development and integration environment through the Common Object Request Broker Architecture (CORBA).

30 Claims, 22 Drawing Sheets

U.S. PATENT DOCUMENTS

| | | | |
|---|---|---|---|
| 6,408,307 B1 * | 6/2002 | Semple et al. | 707/104.1 |
| 6,411,293 B1 * | 6/2002 | Sakamoto et al. | 345/419 |
| 6,577,714 B1 * | 6/2003 | Darcie et al. | 379/93.17 |
| 6,593,926 B1 * | 7/2003 | Yamaguchi et al. | 345/427 |
| 6,600,751 B1 * | 7/2003 | Couturier | 370/401 |
| 6,628,278 B1 * | 9/2003 | Ritter | 345/419 |
| 6,850,946 B1 * | 2/2005 | Rappaport et al. | 707/101 |
| 2001/0040984 A1 * | 11/2001 | Kambe et al. | 382/113 |

OTHER PUBLICATIONS

Clementini et al., "An Oject-oriented conceptual model for the representation of geographic information", Applied Computing, 1991., [Proceedings of the 1991] Symposium on, Apr. 3-5, 1991.*

Clementini et al., "Browsing in geographic databases: an object-oriented approach", Visual Languages, 1990., Proceedings of the 1990 IEEE Workshop on, Oct. 4-6, 1990.*

Chan et al. "Efficient query result retrieval over the Web", Parallel and Distributed Systems, 2000. Proceedings. Seventh International Conference on, Jul. 4-7, 2000□□.*

Koller et al., "Virtual GIS: A Real-Time 3D Geographic Information System", GVU Technical Report GIT-GVU-95-14, Georgia Institute of Technology□□.*

Chan et al. ("Efficient Query Result Retrieval over the Web", Proceedings. Seventh International Conference on Parallel and Distributed Systems, 2000, Jul. 4-7, 2000.*

Wilson et. al.; Design of a Java Interface to a Small Talk OO Mapping Database Utilizing CORBA; Proc. 10th IASTED Intl. Conf., Parallel and Distributed Computing and Systems; Las Vegas, NV: pp. 60-63; Oct. 28-31, 1998.

Cobb et al.; An OO Database Migrate to the Web; IEEE Software; pp. 22-30; May/Jun. 1998.

Abdelguerfi et al.; VPF +: A Vector Product Format Extension Suitable for Three-Dimensional Modeling and Simulation; No./vol. Research Laboratory, NRL/FR/2441-98-9683; Aug. 1998.

* cited by examiner

| Datasets | DNC17[Edition 9: Eastern United States] |
| --- | --- |
| Scale | A1708375[Currituck Beach Light to Wimbl] |
| Features | Bottom Characteristics points[Hydrograph] |
| Query | Q1: Bottom Characteristics points[Hydrog] |

Results for Selected Query

```
201  Bottom Characteristics points[Hydrography:A1708
198  Bottom Characteristics points[Hydrography:A1708
200  Bottom Characteristics points[Hydrography:A1708
```

Attributes for Selected Result

```
Secondary Material Characteristics -- Unknown
Material Composition Category -- Unknown
Material Composition Underlying -- Unknown
Underlying Material -- Unknown
FACC Code -- BF010: US-Bottom Characteristics UK-Quality of the
Physical Surface Characteristics -- Soft
Material Composition Secondary -- Unknown
```

Click here for attribute-level query

| Geometrical | Topological | Clear | Done |
| Up Selected | Up All | Delete Sel | Delete All |

*FIG. 11*

```
GeoPoint gpPoint1 = (GeoPoint)vtrGeopoints.elementAt(i);
GeoPoint gpPoint2 = (GeoPoint)vtrGeopoints.elementAt(i+1);
double distance = gpPoint1.greatCircleDistance(gpPoint2) * 6000 * 0.3048;  // returns nautical miles.
                                          multiply by 6000 for feet.  multiply by 0.3048 to get meters.

public class GeoPoint{

.
   .
   .
   .

public double greatCircleDistance(GeoPoint point2) {
   double nauticalMiles = 0.0f;
   double step1;
   double degreesPerRadian = 180.0 / Math.PI;
   double nauticalMilesPerDegree = 60.0;
   double lat1 = latInRadians();
   double lon1 = lonInRadians();
   double lat2 = point2.latInRadians();
   double lon2 = point2.lonInRadians();

// Calculate step 1 in radians
step1 = Math.acos(Math.sin(lat1) * Math.sin(lat2) +
 Math.cos(lat1) * Math.cos(lat2) * Math.cos(lon1 - lon2)):

nauticalMiles = step1 * degreesPerRadian * nauticalMilesPerDegree;
return nauticalMiles;
}

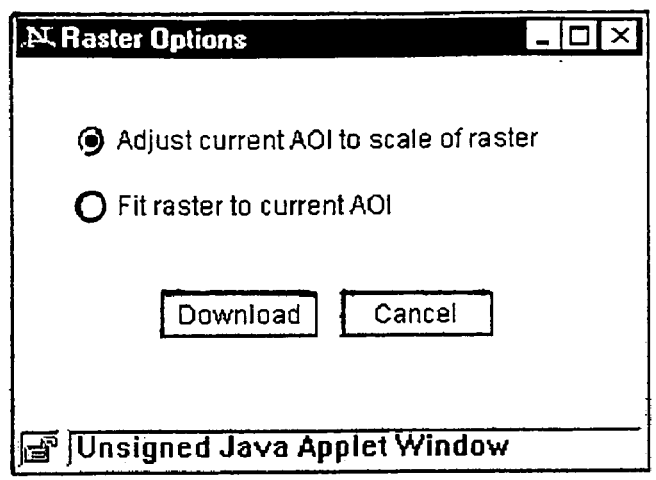
FIG. 16

```
VRMLObject
    VRMLBuilding
    VRMLHydroArea
    VRMLVegArea
VRMLLineFeature
    VRMLBarrierLine
    VRMLHydroLine
    VRMLTransLine
    VRMLUtilityLine
VRMLPointFeature
```

FIG. 20

```
STRUCTURE SHAPE OF ROOF
Flat
    ssr = 41
Pitched
    ssr = 42
```

FIG. 21

```
VPF              VRML
#bldpopa         #VRMLBuilding
#bldinda         #VRMLBuilding
#plazaa          #VRMLPlazaArea
#lakeresa        #VRMLHydroArea
#inshorel        #VRMLHydroLine
#watrcrsl        #VRMLHydroLine
#roadl           #VRMLTransLine
#trackl          #VRMLTransLine
#barrierl        #VRMLBarrierLine
#polbndl         #VRMLBarrierLine
#telel           #VRMLUtilityLine
#obstrp          #VRMLPointFeature
#landmrkp        #VRMLPoint Feature
```

FIG. 22

```
LOD {
  level [
    Inline {url "FireHydrantl.wrl"}
    Inline {url "FireHydrant2.wrl"}
    Group {children [ ] } ]
  range [ 100, 200 ]
  center 0 0 0}
```
FIG. 23
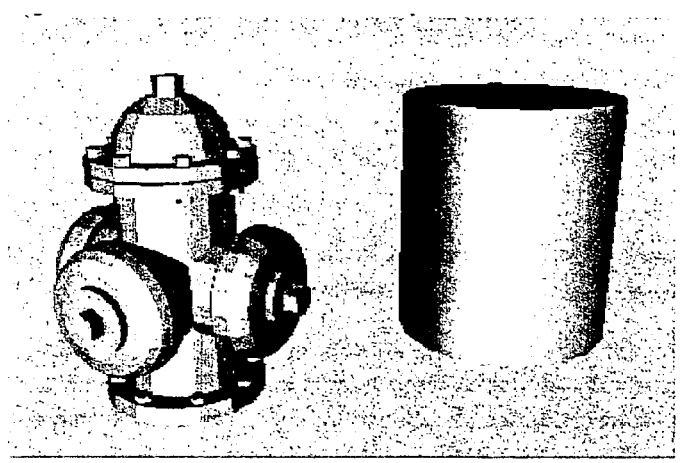
FIG. 24
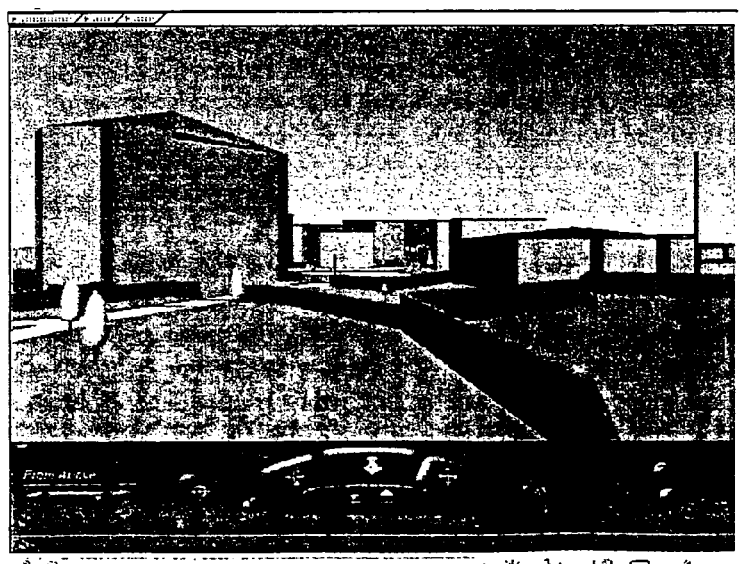
FIG. 25

DISTRIBUTED OBJECT-ORIENTED GEOSPATIAL INFORMATION DISTRIBUTION SYSTEM AND METHOD THEREOF

RELATED APPLICATION

The present application is related to the commonly assigned pending U.S. patent application Ser. No. 09/448,765 filed on Nov. 24, 1999 entitled "Method and Apparatus for Building and Maintaining an Object-Oriented Geospatial Database", which is incorporated by reference herein. This application claims priority from a provisional application, Ser. No. 60/227,847 filed on Aug. 25, 2000, entitled "A DISTRIBUTED OBJECT-ORIENTED GEOSPATIAL INFORMATION DISTRIBUTION SYSTEM AND METHOD THEREOF", Navy Case No. 80, 172.

BACKGROUND OF THE INVENTION

1. Field of the Invention

The present invention relates to distributing information of an object-oriented database using object-oriented technology. More particularly, the present invention relates to distributing and maintaining information of an object-oriented database of geospatial data. Further, the present invention relates to distributing and maintaining information of an object-oriented database of geospatial data of multiple data types, such as Vector Product Format (VPF), Raster Product Format (RPF), Text Product Standard (TPS), Environmental Systems Research Institute, Inc. (ESRI) shape files, Generic Sensor Format (GSF), oceanographic ASCII text data provided by the Naval Oceanographic Office (NAVOCEANO) and geospatial data with temporal information.

2. Description of the Related Art

The object-oriented geospatial database (i.e., database including data having spatial information) described in the pending commonly assigned application referenced herein implements object-oriented geographic data models of vector mapping data, such as VPF. Geographic data modeling using object-oriented technology is in contrast to conventional geographic or geospatial databases, which are implemented as "relational" data models or structures. For example, as discussed in the pending commonly assigned application, in a complex relational database model of vector mapping data, such as VPF provided by the National Imagery and Mapping Agency (NIMA), the database model is represented as "databases", each "database" containing one or more "libraries" with associated "coverages or themes", and "features" associates with each "coverage or theme". In particular, the "relational" data model paradigm typically requires that the "coverage", "features", and topological data reside in many tables that must be queried upon every request for information from the database. Because of the number of tables involved, maintaining referential integrity of the VPF database upon an update is difficult. This difficulty arises because the VPF relies on data residing within multiple specialized tables on multiple levels of the VPF relational database. Further, since viewing, query and manipulation of each geospatial data of a different format typically requires corresponding software, integration of the geospatial-data of different formats becomes difficult at best.

Further, as described in the pending commonly assigned application, in contrast to relational database structures storing geospatial data, an object-oriented data structure storing geospatial data, topological and other spatial relationships reside in linked objects, and updates to the data can be handled more simply and directly. The object-oriented paradigm properties of identity, encapsulation, inheritance, and polymorphism, overcome the problems associated with existing mechanisms for querying, updating, and translating geospatial data, such as VPF data, by providing a geospatial information distribution system that permits easy and complete updating of VPF data, more complex queries of VPF data, and direct exporting of VPF data from the object-oriented database structure into a relational database structure. In particular, the object-oriented paradigm accommodates data-driven (i.e., data structure of data does not have to be known prior to query for information) queries, constrained query, and nested or complex queries. Further, the object-oriented paradigm also permits easy use of data of differing formats and structures within an integrated geospatial information system. In particular, existing data in VPF, RPF, and TPS files are incorporated onto a single, object-oriented platform for access.

A characteristic of a traditional geographical information system (GIS) based upon the "relational" database structure, is that a user's interaction with data via a user interface is at visual level. For example, the interaction between a user and a map display is only at visual level when zooming. In particular, queries in such traditional GIS are considered "pre-formatted" requests. This characteristic frustrates easy distribution and access to continuously updated complex data having spatial information and temporal information.

Further, generally, users have to utilize many software applications on their local computer to access and display mapping data of multiple data types. Typically, data distribution in such systems is in the form of CD-ROM or other media, and would often take days to be distributed to user. For example, data associated with an area of interest (AOI) would be located in several different places (i.e., there is not a single source that users could access to obtain all mapping data available for the AOI). Although, efforts have been made to provide retrieval and viewing of mapping data over the World Wide Web (WWW) these applications are limited in the data types that they can display, and in the availability of data associated with the display. In particular, regarding accessing geospatial databases, traditional systems that use removable storage media replace the existing database on the removable storage media with updated database and distribute the updated database to users. Further, a separate software application or commercial off the shelf software package, such as a GIS software package (e.g., ArcView by Environmental Systems Research Institute, Inc., Redlands, Calif.) customized for or compatible with the database is executed on the user's or local computer (i.e., client computer) to access the database. Such traditional systems may also be implemented over the Internet or the WWW. Similar to the counterpart non-Internet implementations, the database is stored as a library on a server computer connected to the Internet and the library is distributed (i.e., downloaded by the user or local computer using, for example, File Transfer Protocol) to the user's or local computer for access using the separate GIS software package executing on the local computer. Therefore, these traditional systems involve two steps of loading or downloading data or database to the local computer from the remote computer or removable storage media (e.g., CD-ROM) and then loading a separate software application in the local computer to access the data.

The use of geographic data is becoming pervasive across many disciplines. At the same time, end users are becoming increasingly dependent upon the web as a source of readily available, easily accessible information. Accordingly, in view of these two factors there is a need for development of systems capable of immediate and efficient distribution and access to complex data having spatial and temporal information (i.e., geospatial data).

SUMMARY OF THE INVENTION

An object of the invention is to provide a distributed object-oriented geospatial database system and method thereof over a client/server network.

Another object of the invention is to provide a distributed object-oriented geospatial database system and method thereof over the Internet using web-based technology to perform data-driven queries, such as retrieving, viewing and updating, geospatial data of the object-oriented geospatial database, such as vector, raster, hypertext and multimedia data, as well as remote updating of vector data.

Another object of the invention is to provide a distributed object-oriented geospatial database system and method thereof over a client/server network supporting multiple data types or formats of ESRI shape file, GSF, oceanographic ASCII text data by NAVOCEANO and geospatial data with temporal information.

Another object of the invention is to provide a distributed object-oriented geospatial database system and method thereof over a client/server network supporting 3D display of geospatial data.

Yet another object of the invention is to provide a distributed objected-oriented geospatial database system in a heterogeneous object-oriented development and integration environment using the Common Object Request Broker Architecture (CORBA).

The above objects are attained in a networked computer system environment by designing object models for the geospatial data, creating an object-oriented database of the geospatial data using the object models, storing the object-oriented database on a storage unit connected to the network, specifying an area of interest from a map image or visual image, representing active data objects and displayed on a computer on the network, querying from the computer over the network data objects in the database associated with the area of interest, receiving in the computer over the network data objects in the database associated with the area of interest, and displaying the data objects. In particular, querying involves in response to performing a single action, querying from the computer over the network data objects in the database associated with the area of interest.

Further, in a networked computer system environment building and maintaining an object-oriented spatial database from at least two or more data formats by instantiating objects of the object-oriented database, using at least two of the Vector Product Format (VPF), Raster Product Format (RPF), Text Product Standard (TPS), Environmental Systems Research Institute (ESRI) shape, Generic Sensor Format (GSF), Naval Oceanographic Office text (NAVOCEANO), and temporal information databases; initializing spatial and non-spatial feature data of the object-oriented database; and spatially indexing data among objects from the at least two VPF, RPF, TPS, ESRI, GSF, NAVOCEANO and temporal information databases into the single, object-oriented spatial database.

Further, computer programs according to the present invention and stored on a computer-readable media to access in real-time geospatial data over a network, comprise an object-oriented database server code section to store data having spatial and temporal information, a client code section, and an interface code section in communication with the server code section and the client code section over the network to transmit and receive messages querying the data. In particular, programming language of the client code section differs from programming language of the server code section, providing a heterogeneous object-oriented geospatial database system in a networked computer system. Further, the data includes at least two or more data formats of Vector Product Format (VPF), Raster Product Format (RPF), Text Product Standard (TPS), Environmental Systems Research Institute shape format (ESRI), Generic Sensor Format (GSF), and Naval Oceanographic Office text format (NAVOCEANO).

These and other objects and advantages of the invention will become apparent and more readily appreciated from the following description of the preferred embodiments, taken in conjunction with the accompanying drawings.

BRIEF DESCRIPTION OF THE DRAWINGS

FIG. 11 shows a display screen for advanced queries.

FIG. 14A shows a code section in JAVA to calculate distances between two points selected on the display screen.

FIG. 16 shows a display screen relating to raster image display options.

FIG. 20 show a class structure to describe in 3D the geospatial data in the object-oriented geospatial database of the invention.

FIG. 21 show the VPF attributes used in describing in 3D the geospatial data in the object-oriented geospatial database of the invention.

FIG. 22 show mapping of VPF class to VRML class in the object-oriented geospatial database of the invention.

FIG. 23 is a description of levels of detail for a feature of VPF data as displayed in 3D in FIG. 24.

FIG. 24 is a screen display of a feature of VPF data in 3D.

FIG. 25 is another screen display of a feature VPF data in 3D.

DESCRIPTION OF THE PREFERRED EMBODIMENTS

Figure 1:
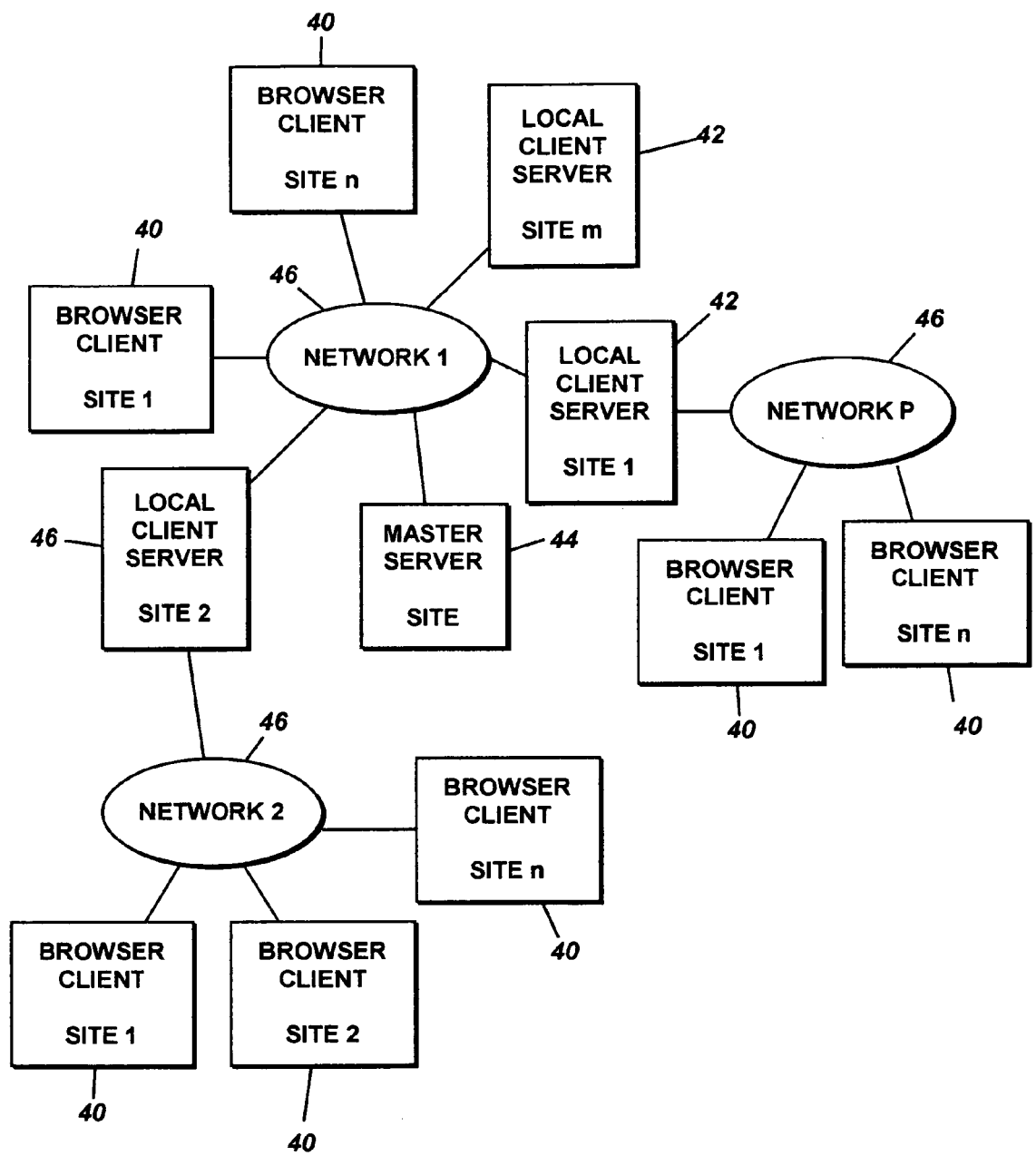
FIG. 1 is an illustration of client/server system in which the invention may be implemented.

Reference will now be made in detail to the preferred embodiments of the present invention, examples of which are illustrated in the accompanying drawings, wherein like reference numerals refer to like elements throughout. The embodiments are described below to explain the present invention by referring to the figures.

The database system according to the present invention, uses Internet enabled technology, such as Web browser technology, and object-oriented technology to provide real-time or interactive remote access to geospatial data over a network (i.e., one step). In particular, the user in one step can, for example, view the data objects stored in a remote location (i.e., computer server), without downloading from a remote computer to the local computer the entire database (or an entire segment of the database) on the local computer and executing a separate software in the local computer to view the database. Further, in contrast to traditional GIS software, which actually stores data on the local computer (e.g., the computer's hard drive), the present invention uses a Web-based applet executing on the local client computer but still resident on the remote server computer. When the browser software is closed, there is no software resident on the local computer's hard drive (i.e., no data had to be downloaded to the local computer's hard drive).

Therefore, the present invention improves the object-oriented geospatial database disclosed in the pending commonly assigned application from the memory resident, stand-alone system and method to a file based distributed object-oriented geospatial database system and method thereof over a client/server network environment and in particular over the Internet using web-based capabilities to view geospatial data, such as vector, raster, hypertext and multimedia data, as well as remote updating of vector data. In particular, the object-oriented geospatial database of the present invention, which is also referred to as the geospatial information database (GIDB) or the geospatial information distribution system (GIDS), is an object oriented digital mapping database system implemented over a computer network system that provides rapid access to multiple mapping data types (i.e., geospatial data) over the computer network system, such as Internet, WWW or Intranet. Mapping data in the present invention is accessed from the GIDS based on user AOI. In particular, in contrast to typical systems (e.g., GIS) providing access to mapping data, in the object-oriented geospatial database (i.e., GIDS) of the present invention, any AOI request activates a portion of the database associated with the AOI (i.e, data-driven queries) such than an object or many objects can be accessed in near-real-time or real-time (as the case may be). The GIDS uses a conventional object-oriented database management system (OODBMS), a conventional interface technology, such as Common Object Request Broker Architecture (CORBA) technology, and a conventional object oriented programming language, such as the Java programming language, to provide rapid access to geospatial data over the network. The GIDS incorporates multiple data types to meet the mapping requirements and needs of users or a device or computer system requesting mapping information from the GIDS. Further, the distributed object-oriented geospatial database system according to the present invention supports additional geospatial data formats of ESRI shape files, GSF, oceanographic ASCII text data provided by the NAVOCEANO, and geospatial data with temporal information. Yet further, the distributed object-oriented geospatial database system according to the present invention supports three-dimensional (3D) display of the geospatial data.

FIG. 1 depicts a block diagram of a network of computer systems of the present invention configured as clients and servers using a client/server system architecture, such as an Internet or Intranet. Referring to FIG. 1, browser clients 40 (sites 1–n), local client servers 42 (sites 1–m), and master server 44 are conventional computers or devices, such as hand-held devices, communicating with each other over the networks 46 (networks 1–p) using Transmission Control Protocol/Internet Protocol (TCP/IP). Conventional, storage units storing information (e.g., hard drives; drives for removable media, such as CD-R, CD-ROM, DVD; or memory, such as RAM) (not shown), may be connected or be coupled to the networks 46 or to browser clients 40 (sites 1–n), local client servers 42 (sites 1–m), and master server 44. Further, conventional display units displaying information, such as images, may be connected or be coupled to the networks 46 or to browser clients 40 (sites 1–n), local client servers 42 (sites 1–m), and master server 44. Although, an exemplary embodiment of the invention as described below is implemented over the Internet or Intranet using TCP/IP connections to distribute and maintain information of an object-oriented database of geospatial data of multiple data types, such as VPF, RPF, TPS, ESRI shape files, GSF, oceanographic ASCII text data provided by NAVOCEANO and geospatial data with temporal information, the invention is not limited to use with any particular type of network, computer system or network communication protocol.

Figure 2:
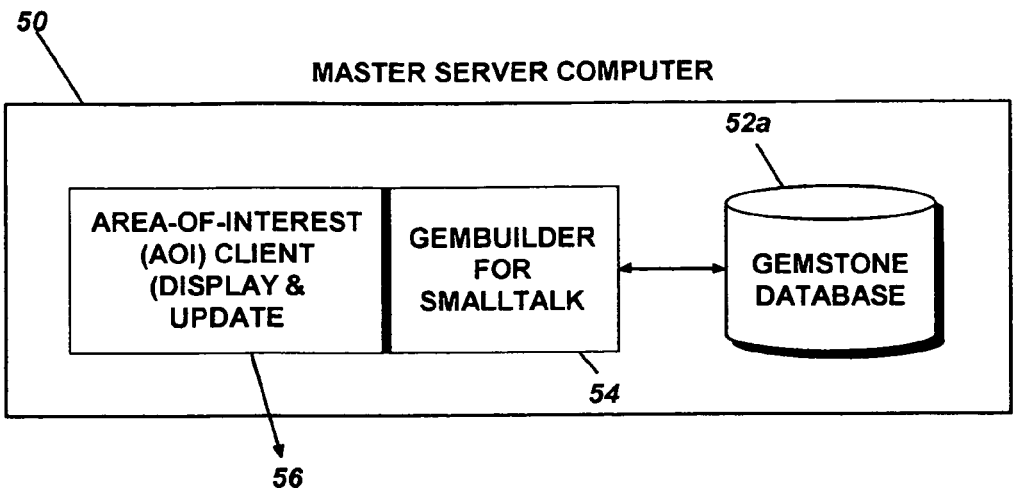
FIG. 2 depicts a block diagram of software system to build, access and maintain information of an object-oriented database of geospatial data of multiple data types in a standalone or non-networked computer system.

FIG. 2, illustrates a diagram of software system to build, access and maintain information of an object-oriented database of geospatial data of multiple data types in a standalone or non-networked master server computer 50. The master server computer 50 is a computer associated with the networked master server computer 44. The present invention is directed to a file based object-oriented database of geospatial data of multiple data types in a standalone or non-networked master server and a distributed object-oriented geospatial database system and method thereof over a client/server network environment and in particular over the Internet using web-based capabilities to view (i.e., query) geospatial data, such as vector, raster, hypertext and multimedia data, as well as remote updating of vector data.

An introduction is provided to software system components of the object-oriented geospatial database. The object-oriented geospatial database system of the invention, which is also referred to as the geospatial information database (GIDB) or the geospatial information distribution system (GIDS), has a client and server function architecture. GIDS is an object oriented digital mapping database that provides access to mapping data over computer network systems, such as Internet, World Wide Web (WWW) or Intranet. As shown in FIG. 2, the GIDS is composed of an object-oriented database server component or module 52a, interface component 54 and client component or module 56 communicating with the server component 52a via or through the interface component 54. The database server 52a may be implemented using a conventional object server. In a preferred embodiment, the database server 52a is implemented using GemStone/S application server for Smalltalk (GemStone) by GemStone Systems, Inc., Beaverton, Oreg., which is a commercial-off-the-shelf object-oriented database management system (OODBMS) (i.e., object server) that stores, manipulates, and processes objects referenced by client modules, such as client module 56. In particular, GemStone is based on Smalltalk, providing a Smalltalk server development environment. Further, client module 56 may be a Smalltalk client or a Web-based client applet, such as Java client, which will be described in more detail below. The OODBMS allows expansion of the GIDS to support world-wide database access driven by area of interest (AOI) queries. Therefore, an AOI may be requested, for example, by a user, and the OODBMS allows a portion of the database associated with the AOI to become active such that an object or many objects can be accessed in near-real-time or real-time (as the case may be). The data is permanently stored as objects in the OODBMS for future access. AOI queries will be described in more detail below. The database server 52a includes two functional modules, one to store geospatial data, including any non-spatial data, and another module to manipulate or process the geospatial data. Based on the request from the client 56, the GemStone server 52a searches and retrieves only those objects that meet the requested criteria. Data search for retrieval is performed mostly on the server for any client, such as client 56, because GemStone is an intelligent object server, storing, maintaining and referencing objects by name. Therefore, an object can be searched and retrieved by specifying the object name. When displaying a digitized map or image of a region, typical GIS relational database servers fetch at a page level associated with the digitized map or image of the geographic region. However, sometimes the exact content of the page may not be explicitly known by the GIS relational database servers. In contrast, in an object-based server system, such as GemStone server 52a, contents of a page can be stored and retrieved at an individual object level. A processing to determine what is on the page can take place by the server rather than by the client.

Figure 3:
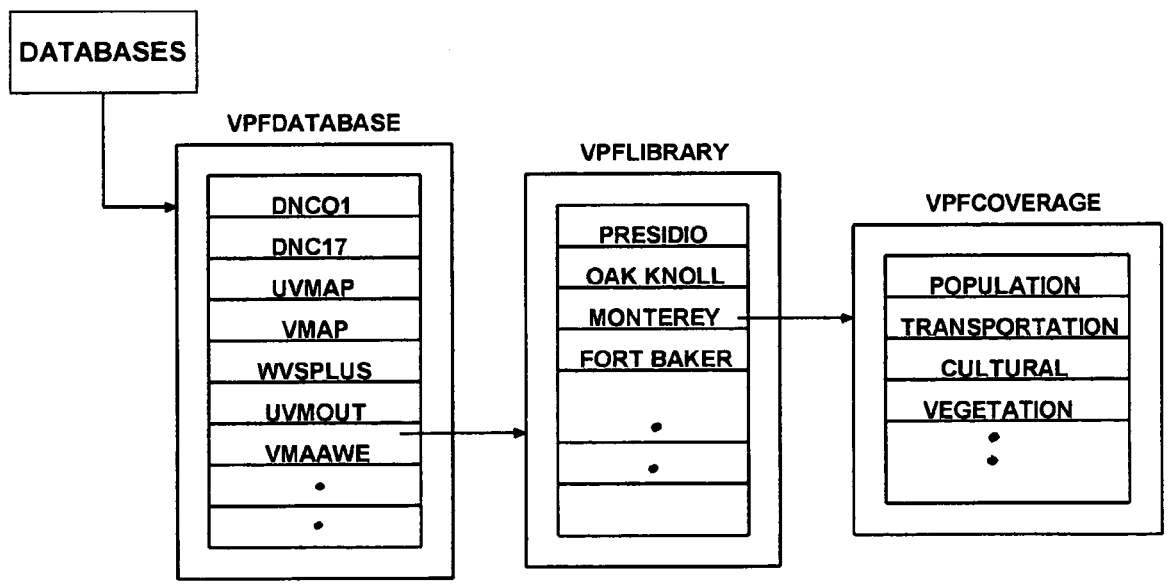
FIG. 3 shows the data structure of an object-oriented geospatial database stored in a storage unit and used in the invention.

FIG. 3 shows the data structure of the database server 52a. In particular, the server 52a maintains vector mapping data, such as VPF data, by providing entry points for the client 56 at the VPFDatabase class level. VPFDatabase class is the superset of all VPF data. VPFDatabase class has a class variable or a global dictionary called "databases" that contains all instances of the VPFDatabase class. A root entry to any "feature" access begins with the "databases" of VPFDatabase class.

The VPF data has a hierarchical structure. The "database" is used to group a set of data that is used for a specific purpose, e.g., Digital Nautical Chart (DNC) for navigation. The Database class contains a collection of "libraries". A "library" is used to group those "features" that are collected at a certain scale over a certain region. There may be some overlap or complete containment of one "library" into another. However, each "library" is unique based on the region and scale. Each "library" subsequently contains a collection of "coverages", where each "coverage" contains those "features" that are related by a common theme, e.g., transportation or cultural. A "database", "library" and "coverage (i.e., theme)" triad, represented as VPFDatabase, VPFLibrary, and VPFCoverage classes uniquely identifies the "feature". The "feature" is defined at the "coverage" level. Due to tabular storage constraints, VPF data structure groups data yet at another layer, "tile". Each "tile" consists of some geographic extent in a minute by minute or a degree by degree manner. In particular, FIG. 3 shows an example of a VMAAWE "database" having a collection of "libraries" such as Presidio, Oak Knoll, etc. A Monterey "library" consists of "coverages" or "themes" such as population, transportation, etc.

The server uses the "coverage" as the minimal grouping level for "features" or "objects". Every instance of the VPFCoverage has an instance of a dictionary collection called covQuad (not shown in FIG. 3). A covQuad maintains all instances of a VPFSpatialDataManager for the "coverage". The VPFSpatialDataManager class represents a spatial indexing scheme for organizing or relating information or spatial data of differing data formats together. The GIDS uses a quadtree spatial indexing scheme to provide a hierarchical clustering of data based on the geographic area. The quadtree recursively divides an area into quadrants, each of which is called a quadcell. In the GIDS, the class named VPFSpatialDataManager is created to represent a quadtree-indexing scheme. All spatial "objects" or "features" are stored and indexed in the quadtree. An insertion of an "object" into the quadtree is based on a bounding box of the "object". A quadcell that will minimally contain the bounding box of the "object" will be selected to store the object.

The VPF data has three types of "features", including point, line and area (polygon). For efficient and faster access and retrieval, each "feature" type has a unique instance of a quadtree, i.e., there are three instances of VPFSpatialDataManager class. Therefore, a covQuad will have three instances of VPFSpatialDataManager keyed by the feature type.

Any data access and retrieval (i.e., query) from the server 52a begins by specifying the "database", "library" and "coverage", typically through a terminal (e.g., browser client computer or graphical user interface 40) and electing a query transaction. A "feature" retrieval (which will be described in more detail below) may specify a part of an area or an Area of Interest (AOI) by specifying a geographic extent or the entire area of the "database" and "library". This request is sent to the appropriate instance of VPFSpatialDataManager for actual "feature" retrieval. Therefore, the object-oriented database server 52a accommodates data-driven simple queries, constrained queries, and nested or complex queries of geospatial data, including non-spatial data, by the client 56.

Next, referencing FIG. 2, the interface to database server 52a in master server computer 50 will be described. A conventional interface system (i.e., client) may be used to query, retrieve and update objects in database server 52a. In one embodiment, a Smalltalk interface system (i.e., Smalltalk client) is used, such as GemBuilder for Smalltalk 54, which is a commercial-off-the-shelf product. In particular, GemBuilder for Smalltalk 54 is an interface between client 56 (i.e., Smalltalk AOI client) and GemStone database server 52a (i.e., Smalltalk server). In a preferred embodiment, which will be described below, an interface system observing CORBA specification or architecture is used. GemBuilder for Smalltalk also maintains its own object names. To establish a connection between Smalltalk AOI client 56 and GemStone 52a, a naming convention of each object must be resolved via a naming interface. In other words, client 56 and server 52a must have an agreement on how to reference an object by name. GemBuilder for Smalltalk 54 provides those classes (i.e., naming interface) that institute a convention for referencing same objects between Smalltalk AOI client 56 and GemStone 52a. For this reason, GemBuilder for Smalltalk 54 requires some knowledge of the database design and implementation and the level of required detail is client dependent. In particular, Smalltalk AOI client 56 connects to object server 52a through GemBuilder for Smalltalk 54. The client 56 mainly populates, maintains, updates and exports data. The client 56 is tightly-coupled to object server's 52a data design, i.e., class definition, class states and behaviors. A similar, if not the same, class definition is used between object server 52a and Smalltalk AOI client 56 so that client 56 closely replicates object server's 52a data design. Due to the data encapsulation property, a reference to an object implies a reference to a self contained object. For those objects that are maintained and managed by object server 52a, a self-contained object can consist of a large web of references to other objects, e.g., pointers. Since an object referenced by Smalltalk AOI client 56 is self-contained, client 56 requests object server 52a to mainly search and return objects. In most cases, client 56 then process the data on the client side. Therefore, client 56 expects from the object server 52a those parts that are needed to solve and derive the solution. Thus, Smalltalk AOI clients 56 can be considered as "fat clients," because the implementation details are replicated on the clients, adding storage requirement. They are expected to process the information retrieved from the object server 52a.

Figure 4A:
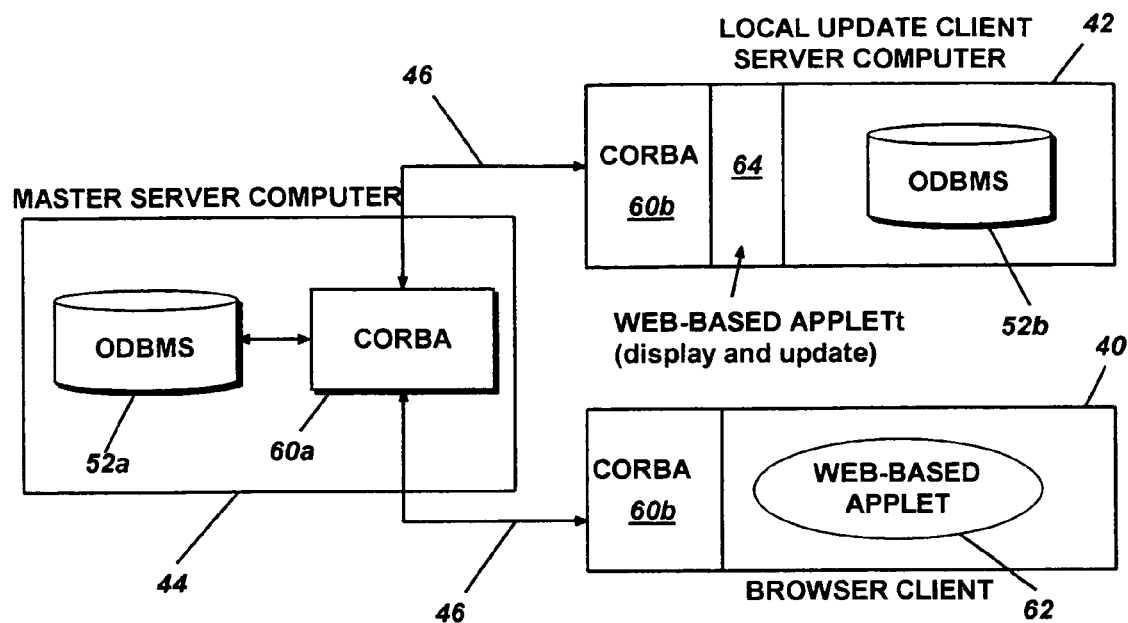
FIG. 4A depicts a block diagram of software system according to the invention in the client/server system in FIG. 1.
Figure 4B:
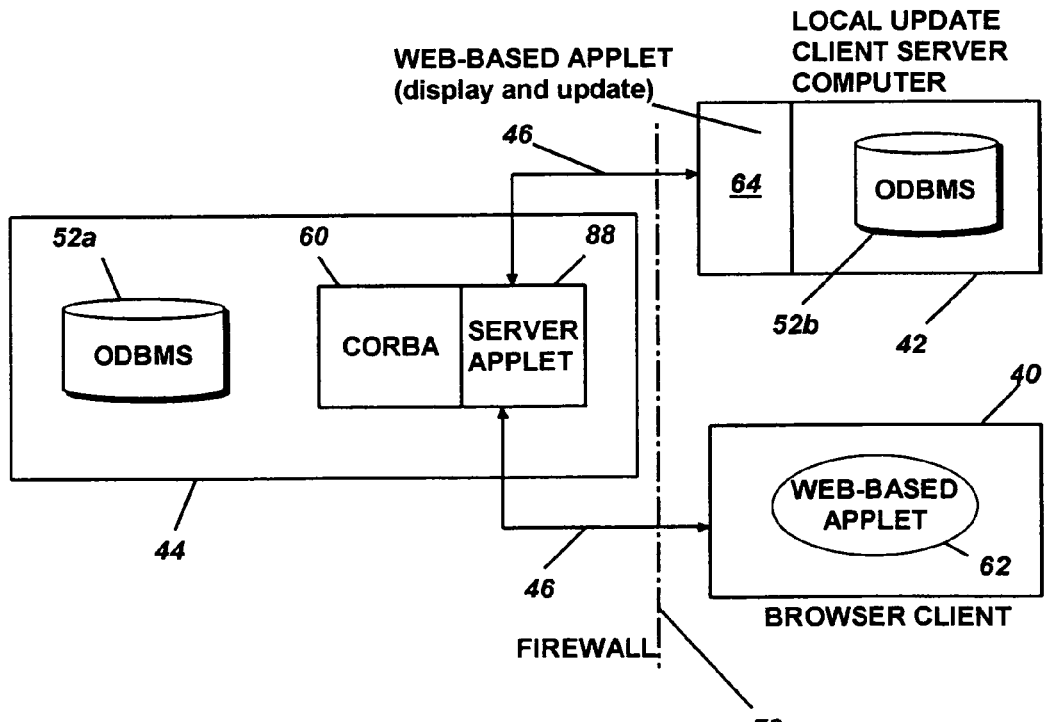
FIG. 4B depicts a block diagram of software system according to the invention in the client/server in FIG. 1, which uses a firewall.

Referencing FIGS. 4A and 4B, software system to interface with the database server 52a in master server computer 44 over a network will be described. An interface system observing CORBA specification or architecture to interface with a Smalltalk object-oriented database server provides a heterogeneous development and integration environment. As shown in FIG. 4A, a preferred embodiment of the GIDS includes an object-oriented database server component or module 52a, interface components 60a, 60b and client component or module (i.e., Web-based client applet) 62 or Web-based applet (display and update) 64 in browser client computer 40 and local client server computer 42 (respectively). The database server 52a is in communication with Web-based client applet 62 or Web-based applet (display and update) 64 in browser client computer 40 and local client server computer 42 (respectively) over the network 46 via or through interface components 60a and 60b. In the preferred embodiment, the interface systems 60a and 60b observe a conventional CORBA specification or architecture. An interface system observing CORBA specification or architecture to interface with a Smalltalk object-oriented database server provides a heterogeneous development and integration environment. FIG. 4B is illustrating software system to interface with the database server 52a in master server computer 44 in a network environment which uses conventional firewall 70 to achieve information security protecting database server 52a. As shown in FIG. 4B, yet another preferred embodiment of the GIDS includes database server 52a, interface component 60 and Web-based client applet 62 or Web-based applet (display and update) 64 in browser client computer 40 and local client server computer 42 (respectively). The database server 52a is in communication with Web-based client applet 62 or Web-based applet (display and update) 64 in browser client computer 40 and local client server computer 42 (respectively) over the network 46 and through firewall 70 via interface component 60. Web-based applet (display and update) 64 is in communication with database server 52b. Software system in local client server computer (i.e., local update client server or GIDS client/server) 42 will be described in more detail below as part of description of the distributed architecture of the geospatial database system according to the present invention.

Figure 5B:
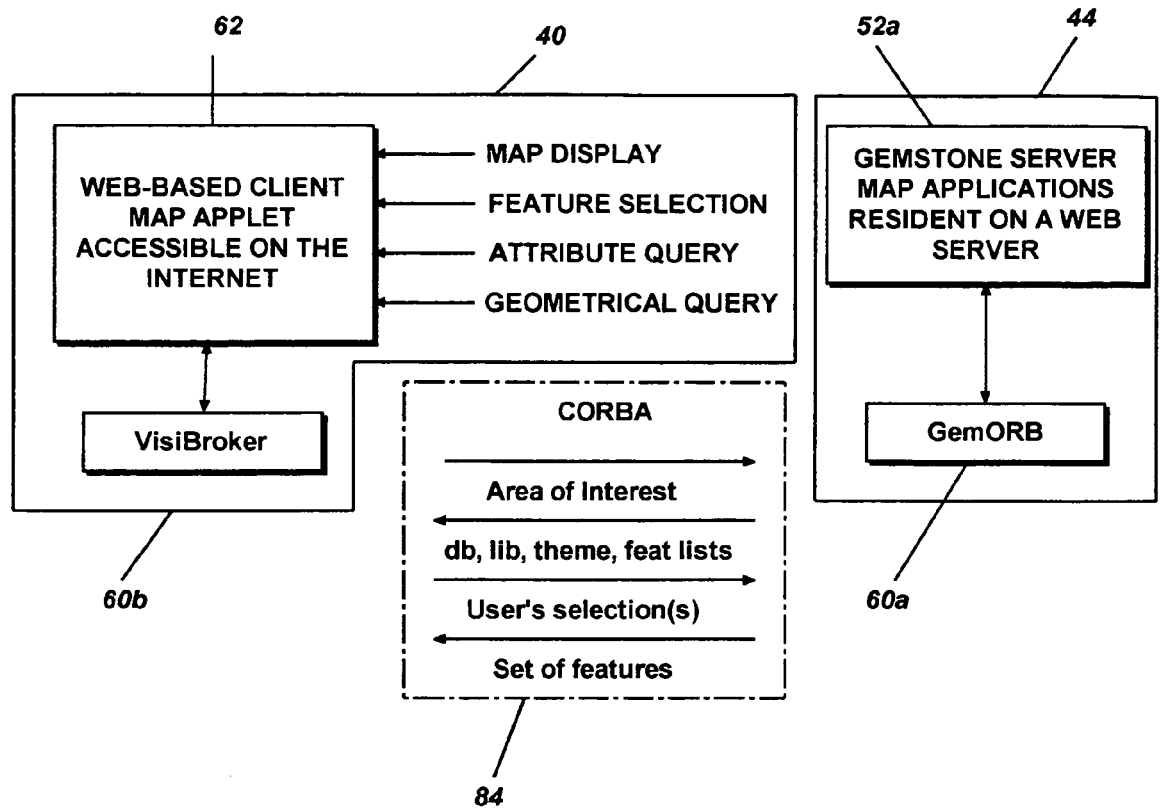
FIGS. 5A and 5B depict a more detailed block diagram of the software system according to the invention in the client/server system in FIG. 4A.
Figure 5A:
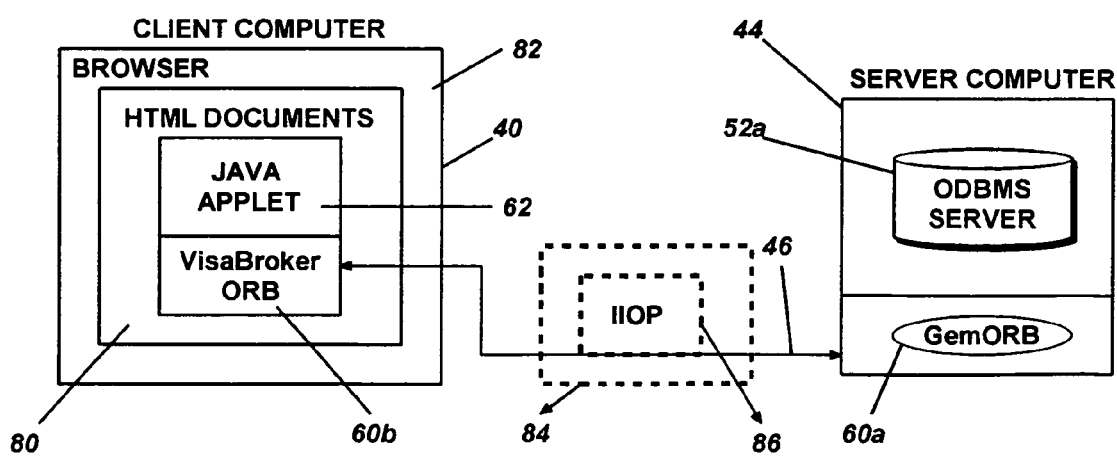
Figure 6B:
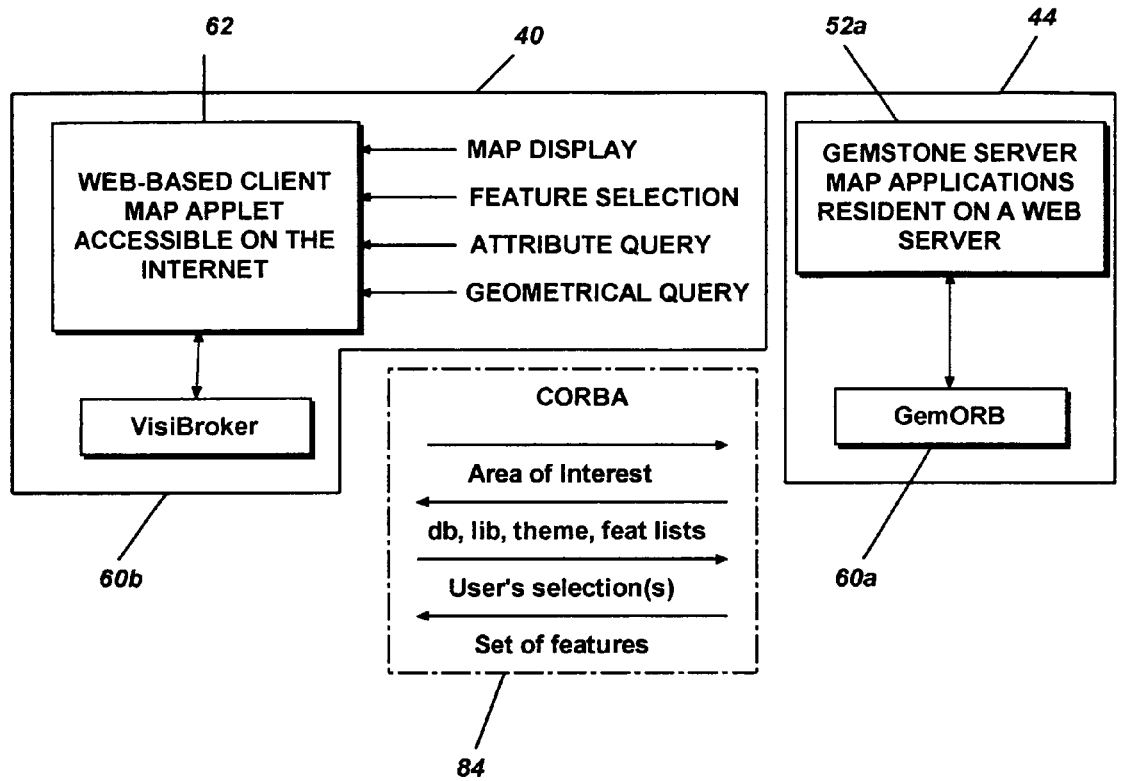
FIGS. 6A and 6B depict a more detailed block diagram of the software system according to the invention in the client/server system in FIG. 4B.
Figure 6A:
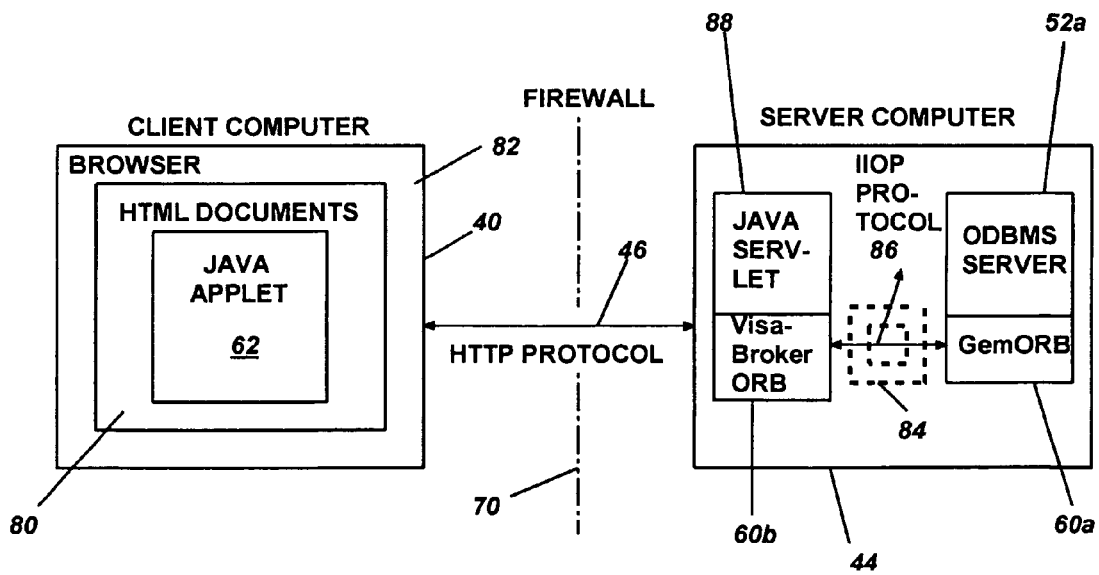

FIGS. 5A, 5B, 6A and 6B, illustrate the software system in FIGS. 4A and 4B in more detail respectively, in particular interface system 60. The software system of database system according to the present invention shown in FIGS. 5A and 5B is essentially the same as software system of database system according to the present invention when firewall 70 is used as shown in FIGS. 6A and 6B, excepting for location of certain system components or modules, which will be described in more detail below. Therefore, the software system of database system according to the present invention will be described with reference to FIGS. 5A and 5B. As mentioned above, interface system 60 complies with CORBA specification. The main component of the CORBA specification is the Object Request Broker (ORB). The ORB is responsible for intercepting an object request, locating the object for handling the request and invoking the correct method on that object. This often involves converting parameters from a common data type to a language-specific data type and vice versa (a process known as marshaling and unmarshaling), as well as returning results from the invoked method. Any two ORBs that are CORBA compliant can provide communication between their application objects or ORB vendors (e.g., database server 52a and client 62), regardless of programming language or platform. Therefore, a conventional ORB may be used on or with the client side, e.g., Web-based client applet 62 or Web-based applet (display and update) 64, and a conventional ORB may be used on or with the server side, e.g., database server 52a. The ORBs correspond to interface system 60a, 60b in FIG. 4A and interface system 60 in FIG. 4A. Therefore, ORBs establish transmission means for communicating object requests to display, select and query objects interactively between application objects. Referencing FIG. 5A, in the preferred embodiment, VisiBroker ORB 60b by Inprise Corporation, Inc., Scotts Valley, Calif., is used with the Web-based client applet 62 and GemORB 60a by GemStone Systems, Inc. is used with the database server or GemStone server application 52a. In particular, VisiBroker ORB is used as a Java ORB and GemORB is a Smalltalk ORB, which establish communication between a Smalltalk based database server 52a and a Java client applet 62 over network 46, which provides a heterogeneous object-oriented database system environment. These two vendor ORBs allow communication between applications (i.e., database server 52a and Web-based client applet 62) via CORBA's Internet Inter-ORB Protocol (IIOP) 86. The use of ORBs, such as GemORB and VisiBroker ORB is transparent to anyone accessing the applet 62.

With reference to FIG. 6A, in the database system according to the present invention when firewall 70 is used, VisiBroker ORB 60b executes in server computer 44. In FIG. 6A, ORBs 60a and 60b (i.e., interface system) are associated with interface system 60 in FIG. 4B. A Web-based server applet, such as Java server applet 88, interfaces Web-based client applet 62 with VisiBroker ORB 60b via a network 46 using a conventional network protocol, such as HyperText Transfer Protocol (HTTP). When firewall 70 is used, data is HTTP-wrapped to get it through the firewall, then unwrapped by the server applet 88 and sent via standard CORBA IIOP to the ODBMS.

FIG. 5A illustrates software system in browser client computer 40 in more detail. In particular, Web-based client applet 62 is embedded in a conventional mark up language document, such as HyperText Markup Language (HTML) document 80, processed by conventional Web browser software 82, such as Netscape Navigator 4.5 by Netscape Communications Corporation or Microsoft Internet Explore by Microsoft Corporation. In the preferred embodiment, in which Web-based client applets 62 and 64 are implemented using Java, the Web browser software 82 would be a Java-enabled Web browser software. Since the Web-based client applet 62 is implemented at browser level, it is operating system independent.

With reference to FIG. 5A, GemORB 60a establishes a connection to the object server 52a through CORBA compliant communication. GemORB 60a provides those classes that represent and implement CORBA. Unlike GemBuilder for Smalltalk 54, a connection via GemORB 60a by client (i.e., GemORB client) 62 does not require an in-depth knowledge of the system design and implementation of object server 52a. An Interface Definition Language (IDL) file defines a correct mapping of objects between the client and the server (i.e., Java client applet 62 and object server 52a). An IDL file also defines operations or methods that are available for client 62 to invoke on the server 52a. Since GemORB 60a is based on CORBA, all the benefits of interoperability among programming languages and platforms apply. In ORB based client and server architecture, in contrast to GemBuilder for Smalltalk 54, GemORB client 62 does not reflect server's 52a design. The GemORB client 62 interfacing with object server 52a using VisiBroker ORB 60b and GemORB 60a minimizes information maintenance and storage by relying on the object server 52a to be a centralized data storage as well as a centralized processing center. The GemORB client 62 requests information from object server 52a expecting the object server 52a to search and completely process information. The GemORB client 62 will receive fully processed information that can be readily used without further processing. GemORB clients 62 expect an answer to a question, while Smalltalk AOI clients 56 expect from the object server 52a those parts that are needed to solve and derive the solution. Thus, in contrast to Smalltalk AOI client 56, GemORB client 62 is considered a "thin client" because the implementation of objects are not represented in client 62 (i.e., there are not much processing involved on the client side).

Next the preferred embodiment of Web-based client applet implemented using Java (i.e. Java client applet Web mapping toolkit) 62 executing in client computer 40 will be described. The objective of Java client applet 62 is to have an Internet Java-based mapping client, which provides display and query capabilities from a set of geographic objects (i.e., geospatial data), such as raster images and vector "features". These geographic objects would be retrieved from GemStone OODBMS 52a, which acts or functions as a server, and displayed by the Java client applet 62. In particular, client applet 62 uses conventional core Java classes to draw the "features" and images on the display screen of the computer. In particular, all drawings occur within a Java Panel or a Java Frame created within the applet. A Graphics context is created and then the "feature" is drawn within the Graphics context. If the "feature" is a point, then gc.fillOval function is used to draw a small circle representing the point "feature". If the "feature" is a line, such as a road, the vg.drawline function is used. If the "feature" is an area, such as a building, a Polygon is defined with coordinates of the building and then the gc.fillPolygon function is used.

As discussed above, communication between the Java client applet 62 and GemStone server 52a is accomplished using VisiBroker ORB 60b and GemORB 60a CORBA compliant ORBs. FIGS. 5B and 6B show application level protocol 84 to transmit data-driven query and response messages between Web-based client applet 62 and object server 52a. The application level protocol 84 is a higher level protocol in relation to IIOP 86 in protocol hierarchy between Web-based client applet 62 and object server 52a.

Figure 7:
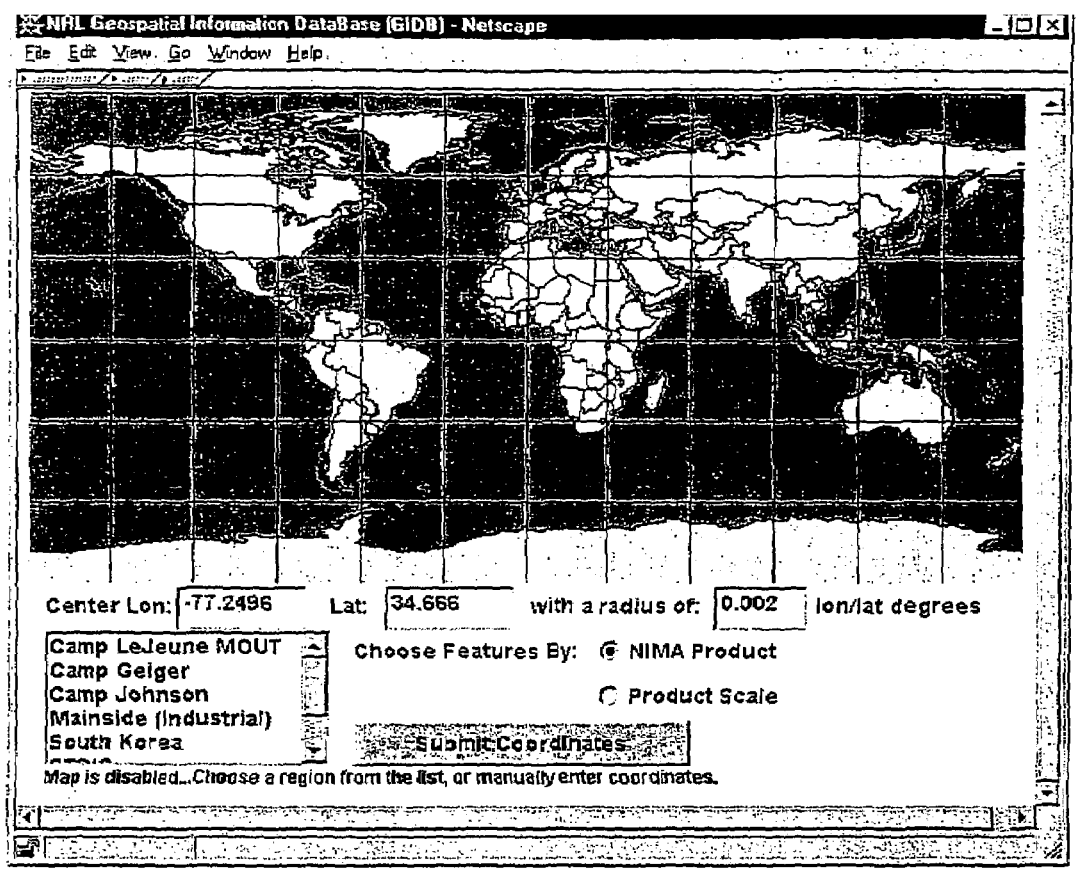
FIG. 7 shows a display screen of the system according to the invention for selecting an AOI.
Figure 8:
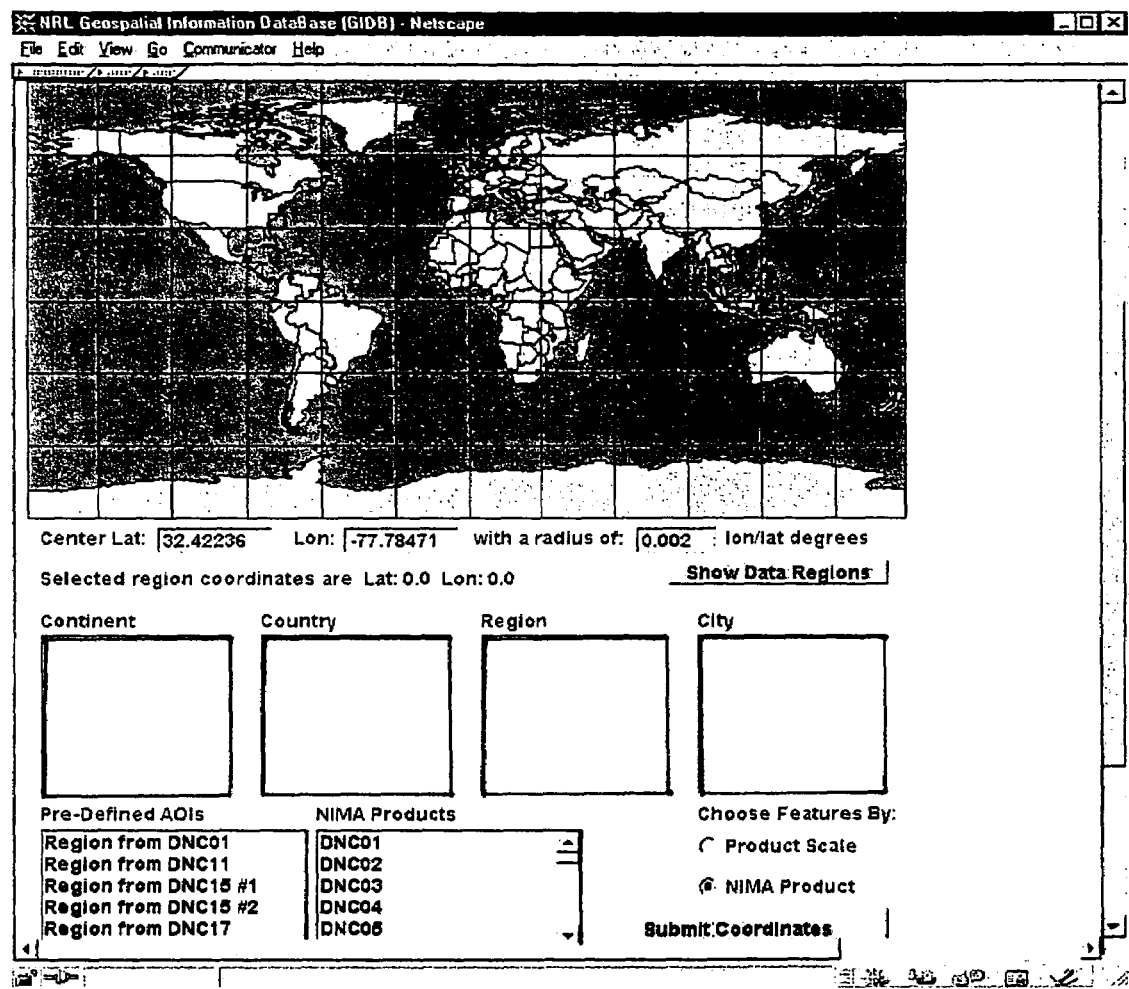
FIG. 8 shows another display screen of the system according to the invention for selecting an AOI.
Figure 9:
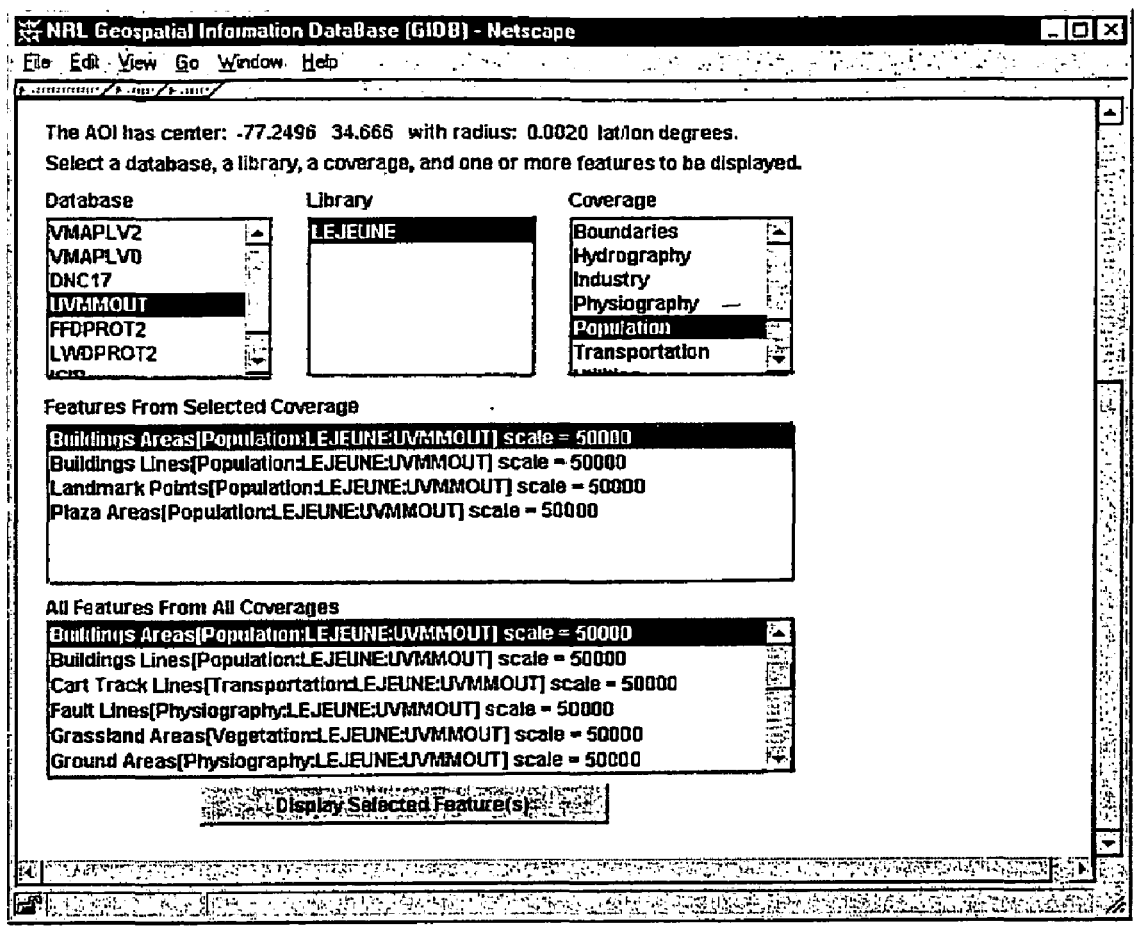
FIG. 9 shows a display screen of the system according to the invention for selecting active or available data represented as databases, libraries, coverages, and features corresponding to the selected AOI in FIG. 7 or 8.
Figure 10:
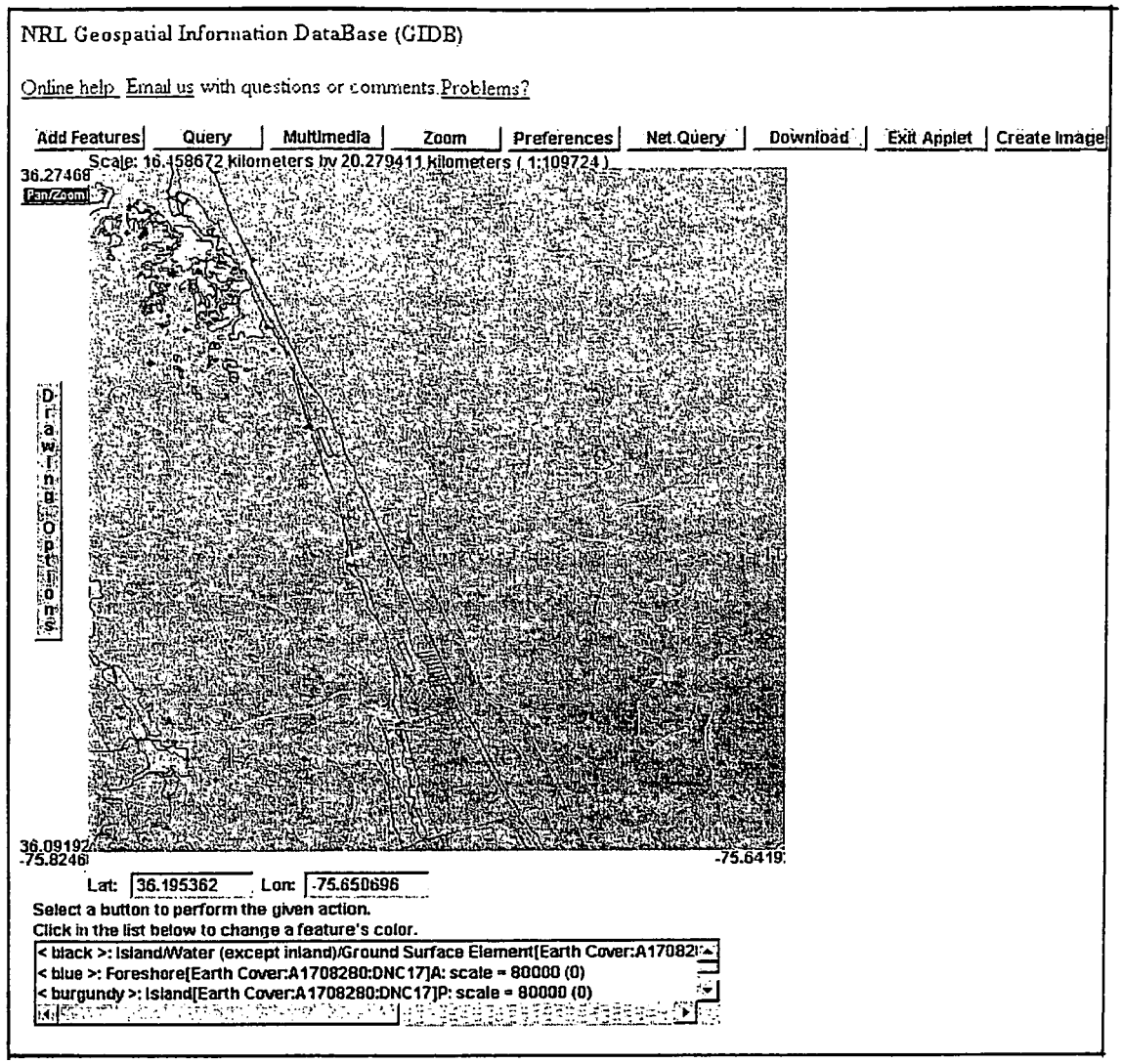
FIG. 10 shows a display screen of the system according to the invention for displaying features available for the selected AOI with reference to an available map image associated with the AOI.

Next, application protocol 84 will be described in more detail. The retrieval of "features" from the server database 52a is based on the AOI concept. FIGS. 7 and 8 show display screen of the Java client applet 62 displaying a world map from which a user can select a location graphically through the use of a rectangle (bounding box). The user also has the option of entering the coordinates for the AOI manually, or selecting a predetermined region as shown in FIG. 8. From the user input, a bounding box of the AOI is transmitted from client applet 62 via CORBA to Smalltalk server 52a. The server 52a responds with a set of "database" and "library" names for which data is available in the selected region. As discussed above, National Imagery and Mapping Agency (NIMA) provides VPF data in "databases", and each "database" contains one or more "libraries". As shown in FIG. 9, the user then selects a "database", "library" and "theme" (shown as "coverage" in FIG. 9). Once a "database" is selected, all "libraries" for the selected "database" are provided or displayed. Once a "library" is selected, all "themes" for the selected "library" are provided or displayed as well as a list of all of the "features" for all of the "themes" is provided or displayed (as shown in "All features from all coverages" box in FIG. 9). Once a particular "theme" is selected, set of "features" associated with the selected "theme", resulting (as shown in "Features From Selected Coverage box" in FIG. 9) in a list of "feature" classes associated with the selected "theme", is returned from the server 52a through another CORBA request. Finally as shown in FIG. 9, the user may select the desired "feature" classes of the selected AOI and submit a request for them to be displayed by clicking on the Display Selected Feature(s) button. The "feature" request results in another CORBA communication from applet 62 to server 52a, and server 52a returns to applet 62 a set of all of the requested "feature" classes, which are located in the given AOI. In particular, after clicking on Display Selected Features in FIG. 9, a map (e.g., raster image) appears showing the selected "features". FIG. 10 shows a display screen for displaying the returned or available "features" for the selected AOI with reference to a map image. In particular, FIG. 10 show a display of the returned "features" with reference to an available raster image associated with the AOI. The "features" that are returned are complex objects with both geometric (coordinate) and attribute information. The applet 62 can then display, select, and query on the returned "features" as shown in FIG. 10.

In particular, in FIGS. 7, 8, 9 and 10, each menu selection, for example, by highlighting a menu item (e.g., "database" UVMMOUT in FIG. 9) using a pointing device or keyboard connected to computer 40, causes a query request according to application protocol 84 for available or active geospatial data (i.e., data-driven query over a network) from Web-based client applet 62 in computer 40 to server 52*a*, for example, in computer 44. In particular, each visual screen is a representation of active data. Further, with data-driven queries, there is no need to know the data-structure to query for information, since any information associated with an AOI is provided upon query. Therefore, the application protocol 84 establishes data zoom means for querying, selecting and displaying available geospatial data objects associated with a geographic area of interest from a geospatial object-oriented database over a network. An advantage of having Web-based client access to an object-oriented mapping database is to give end users the ability to interactively access and use geospatial data quickly (i.e., in near real-time or real-time as the case may be) and efficiently. As discussed above, users of geospatial data typically must have separate software installed into their computer system to view the geospatial data also resident on their own computer systems, and must obtain the data on CD-ROM or other storage media. The Web-based client applet 62 allows any user with a computer or device with Web browser technology, such as Netscape 4.5, to access the GIDS over the Internet and display map data available in the user's area of interest. In addition to display of map objects, the functionality of the Web-based client applet 62 includes zoom capabilities (i.e., data level zoom) as simple queries, individual "feature" selection, "attribute" queries, geometrical queries, and updates of "attribute" values.

As shown in FIG. 10, after the selected "features" in the user's AOI have been returned to Web-based client applet 62 from server 52*a* and displayed by Web-based client applet 62, the user can perform other functions on the selected "features" and to query additional information and details associated with the selected "features" (e.g., "attributes" of the "feature"). For example, an individual "feature" may be selected (i.e., queried) by performing a single action of clicking on the "feature" on the map pane, resulting in sending a query or request to server 52*a* and receiving a response from server 52*a* of active data objects, such as the multimedia information of that "feature" and "attributes" of that "feature", which includes information, such as name, scale, and other details (i.e., a simple query). The Web-based client applet 62 then displays multimedia information of that "feature" and "attributes" of that "feature". In FIG. 10 the "features" are represented on the map by square symbols, although other representations, such as graphical icons or NIMA's symbols may also be used. Further, with reference to FIG. 10, the user can change the colors of the "features" to distinguish between the "feature" classes retrieved and other available "feature" classes. A color key may be shown providing the color, "feature" class, and number of those "features" in the user's selected AOI. The user also may have the ability to change the color of the background. Zoom capabilities are provided, allowing the user to zoom in, zoom out, or zoom to a user-specified area in the AOI. As discussed above, in contrast to traditional GIS systems, the zoom function is at the data level rather than at the visual level. Each individual map screen display in the database system of the present invention is a representation of active or available data.

With reference to FIG. 10, a query may also be performed by clicking on the Query button. This query lists all of the "features" in the map pane and gives the user access to "attribute" information of each "feature". More advanced queries may also be performed. The advanced query allows users to display new "feature" classes in the AOI. The user may also perform "attribute-level" queries. For example, the user can request for all of the four-lane roads to be highlighted, or for all buildings that function as government buildings to be highlighted. Users can also perform geometrical queries, such as "find all buildings that are greater than 50 feet from the road," or "find all homes that are within 20 meters of the Embassy."

Next the query functions of the present invention will be described in more detail. In particular, the query functions include five types of query. A simple query, displays a list of "features" on the map. Clicking on one the "features" in the list provides or retrieves from server 52*a* information on selected "feature" and will highlight the feature red on the map.

FIG. 11 shows a display screen for advanced query. This display screen shows the selected database and library associated with the AOI. A list of "features" is also provided, which upon selection (i.e., query) will appear on the map in light green. The user can choose more than one, and the last one chosen will appear in light green, otherwise it will be the color specified on the color code (which can be changed by clicking on the color) that appears below the map in FIG. 10. The results of the query are shown in the box labeled Results for Selected Query in FIG. 11. If one of these results is clicked or selected, the "attributes" of the "feature" clicked on will appear under Attributes for Selected Results. To do an attribute level query, the attribute-level query button is clicked or selected. After two queries are performed in the advance query mode, the Geometrical button may be clicked or selected, which accommodates finding all "features" that are certain distances from other "features."Distances between "features" may be calculated using conventional formulas or routines, for example, by converting latitude-longitude coordinates to screen coordinates and vice versa.

Figure 12:
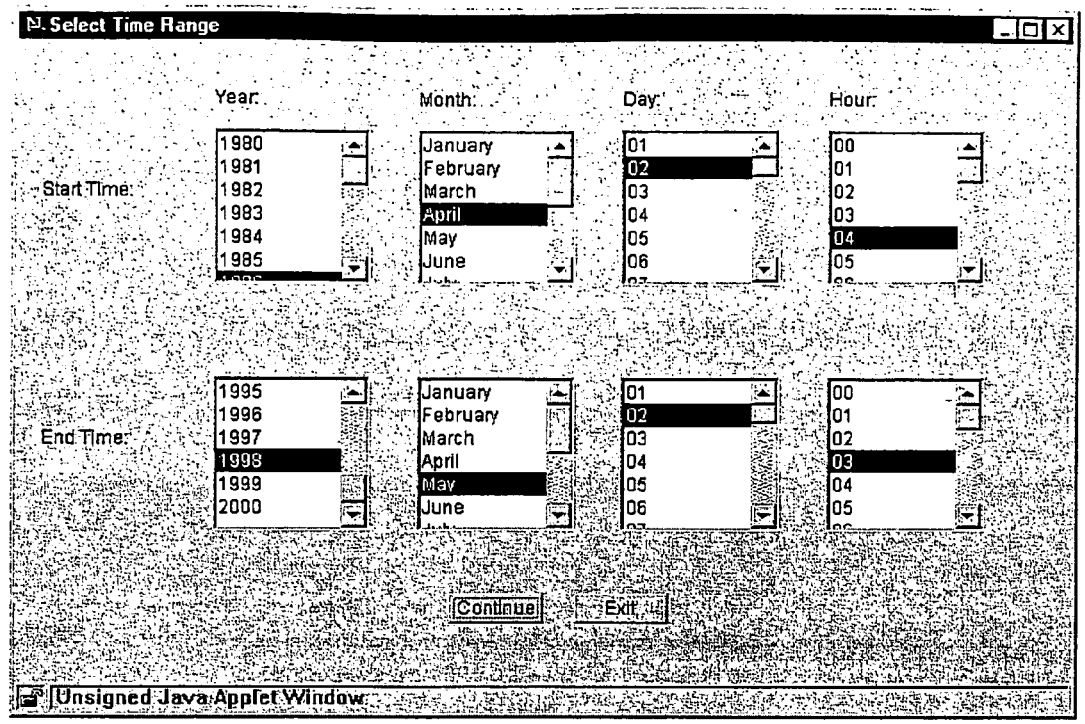
FIG. 12 shows a display screen for temporal data queries.

With reference to FIG. 12, temporal queries may be performed. In particular, another data type included in the object-oriented geospatial database of the present invention is time-varying information associated with data. Therefore, GIDS includes data that has both spatial and temporal aspects or information. For example, temporal information collected by environmental sensors (i.e., a "feature" or spatial data information) in the AOI allows the user to query weather conditions in the AOI by inputting the time range and the requirements for the environmental sensors. This would be a temporal-to-spatial type query. The user is then presented with a list of times that meet those requirements and from which the user can choose to view pictures and charts of the results. A query may also be made from spatial-to-temporal for spatial data (i.e., an environmental sensor or "feature" on the map) that has temporal information.

Figure 13:
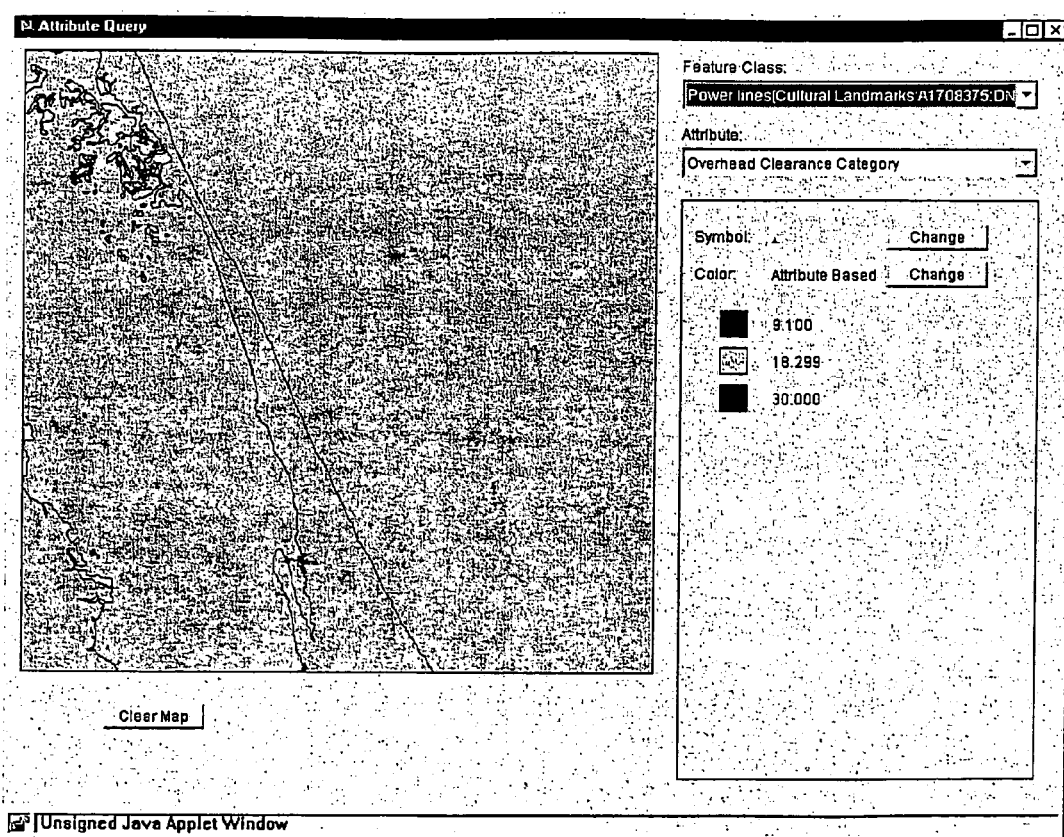
FIG. 13 shows a display screen for attribute queries.

With reference to FIG. 13, "attribute" query allows the user to view individual types of "features" and their properties. For example, by clicking on "Roads" under the Feature Class pull-down menu and "Median Category" under the Attributes pull-down menu in FIG. 13. Such query would color-code the roads on the map as to whether they have medians.

Figure 14:
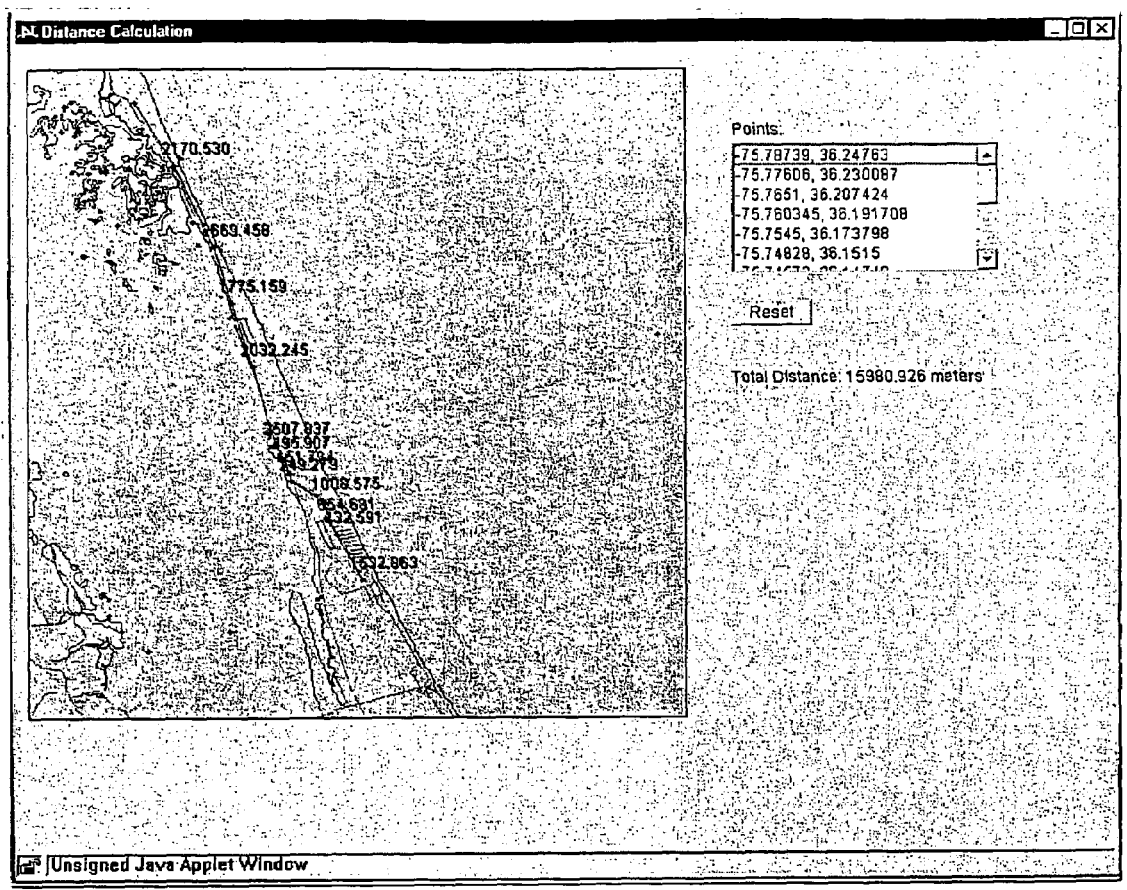
FIG. 14 shows a display screen for queries relating to distances between two points selected on the display screen.

With reference to FIG. 14, "distance" query displays a graphical user interface window with a map (which is a data object queried and displayed by Web-based client applet 62). The user may click anywhere on this map and then somewhere else to find the distance between the two points (i.e., distances between anywhere the user clicks on the screen). Above the second point is the distance of that leg. If the user clicks somewhere else, the distance between the new point and the point before it is shown above. The total distance of the "journey" (as shown in FIG. 14) is shown to the right of the map. A "journey" is the distance between the first point in the first line segment to the second point in the last line segment. Similar to geometrical queries discussed above, distances between points selected on the display screen of the computer displaying the AOI data object (i.e., the map) may be calculated using conventional formulas or routines, for example, by converting latitude-longitude coordinates to screen coordinates and vice versa. For example, within Web-based client applet 62, a GreatCircleDistance class calculates the distance between 2 points called GeoPoints (a latitude and a longitude). The GeoPoints are created in the applet by using the range of the AOI and the mouse click location. FIG. 14A shows a JAVA code section of the applet that calculates the distance between two points selected on the display screen of the computer on which Web-based applet 62 is executing (e.g., computer 40). With reference to FIG. 14A, "distance" in the code section is the great circle distance between 2 points clicked on the screen, with gpPoint1 being the first point and gpPoint2 being the second point of a line segment formed between two points clicked.

Figure 15:
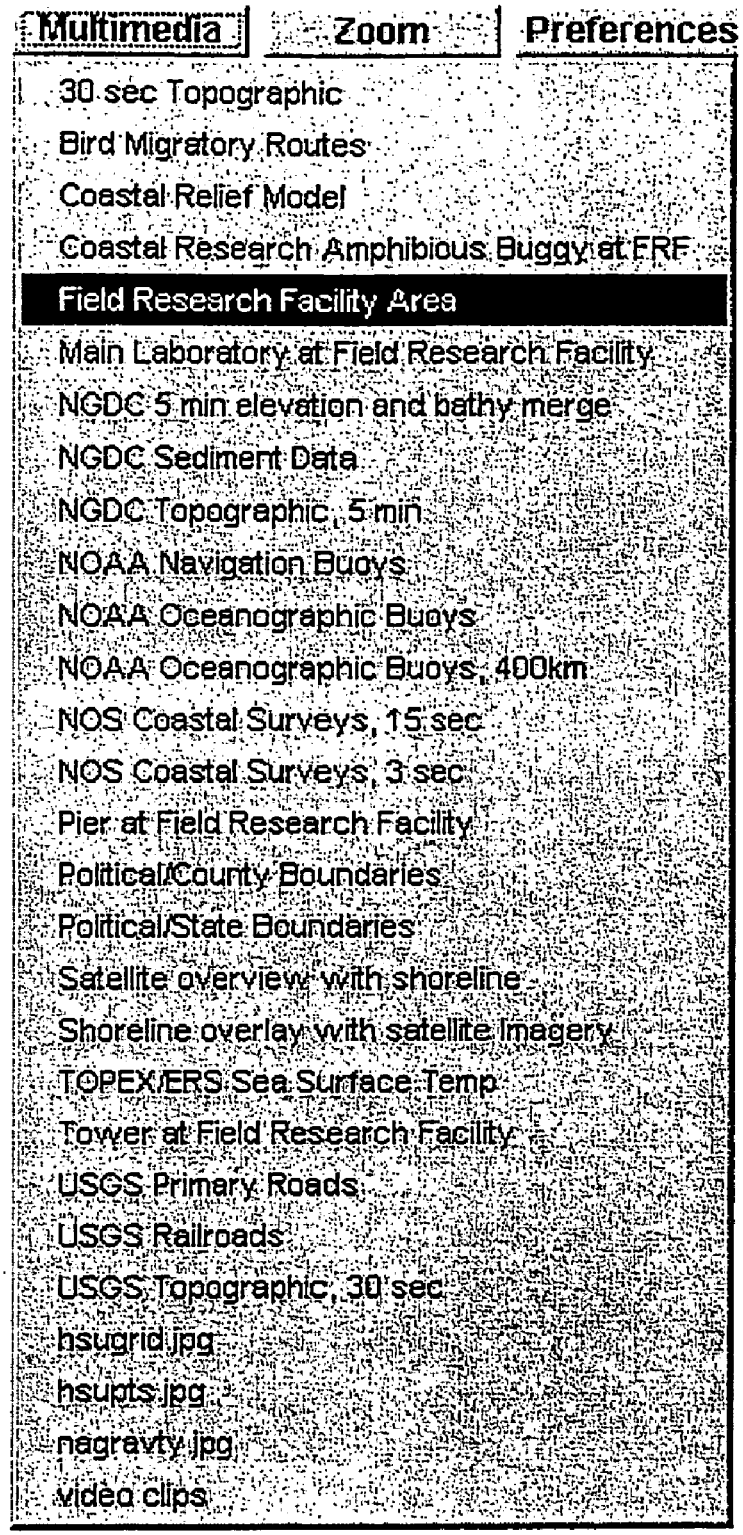
FIG. 15 shows a display screen for querying available multimedia relating to the AOI.
Figure 17:
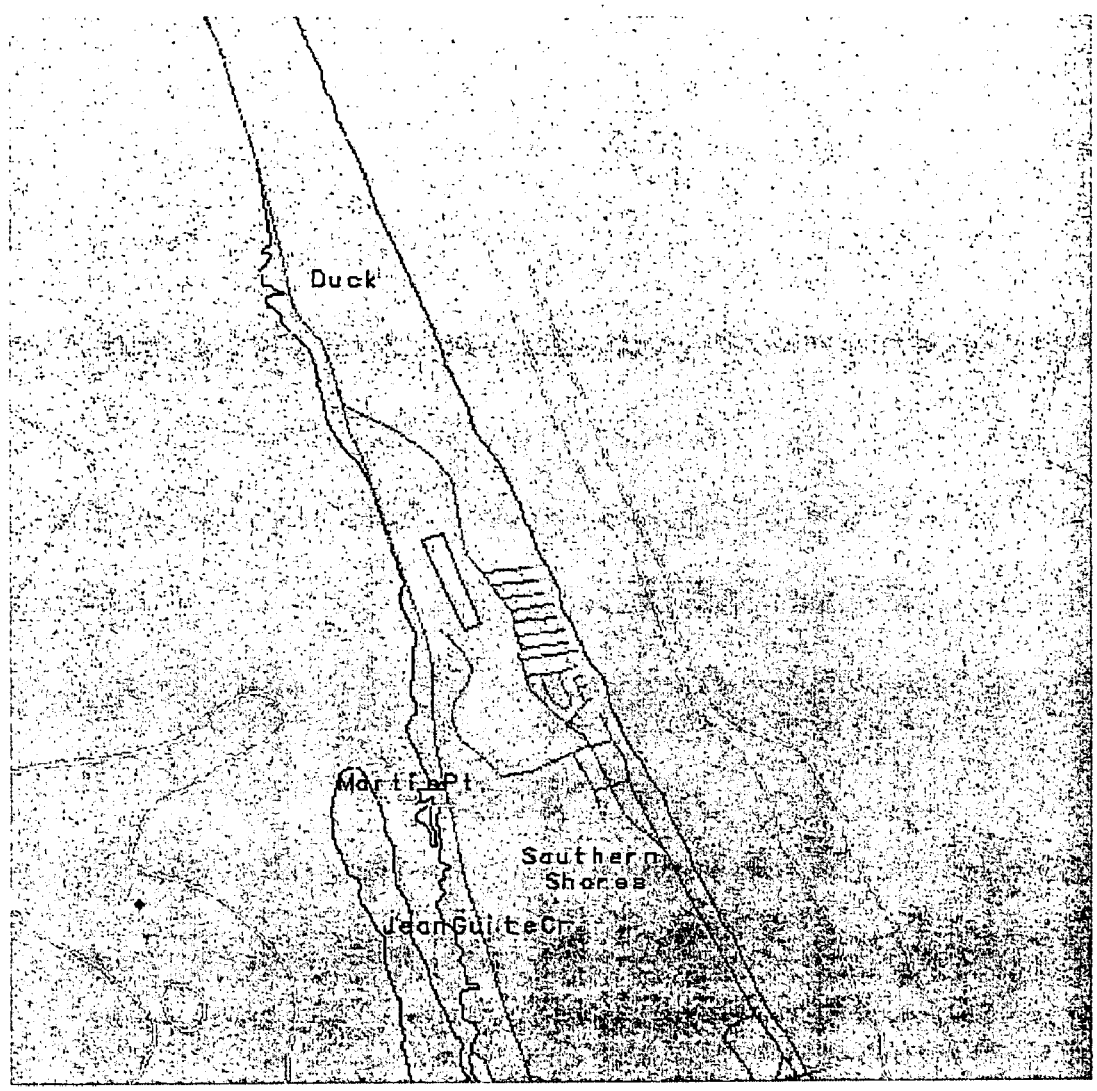
FIG. 17 shows a display screen displaying text features.

FIG. 15 shows a display screen for querying multimedia items relating to the AOI by selecting the multimedia button in FIG. 10. Selection of the Preferences button in FIG. 10 allows Change Background and Display Text Features functions. FIG. 16 shows a display screen for changing the background color of the map or as raster options place the map on top of an image (i.e., satellite picture of the area or aeronautical chart). FIG. 17 shows a display screen for displaying any text that belongs on the map.

Figure 18A:
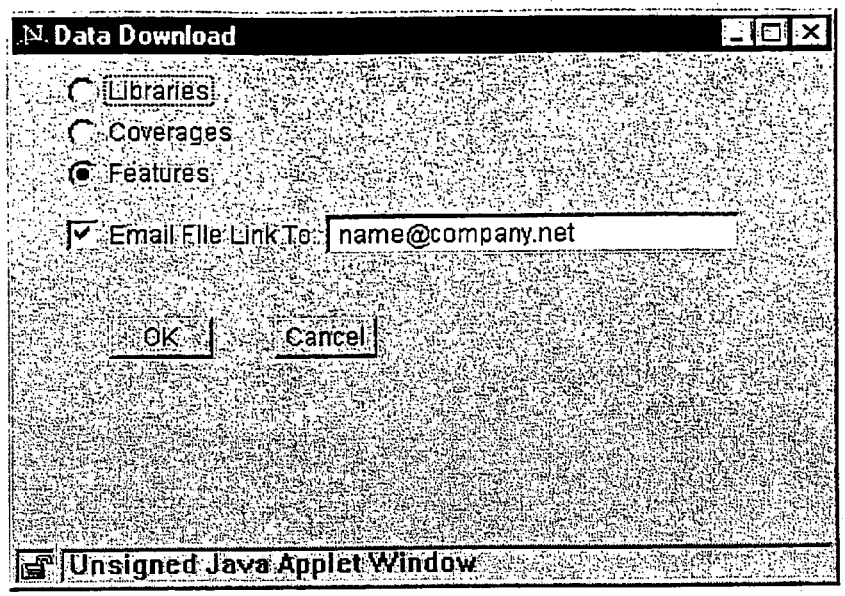
FIG. 18A shows a display screen for downloading libraries, coverages or features.
Figure 18B:
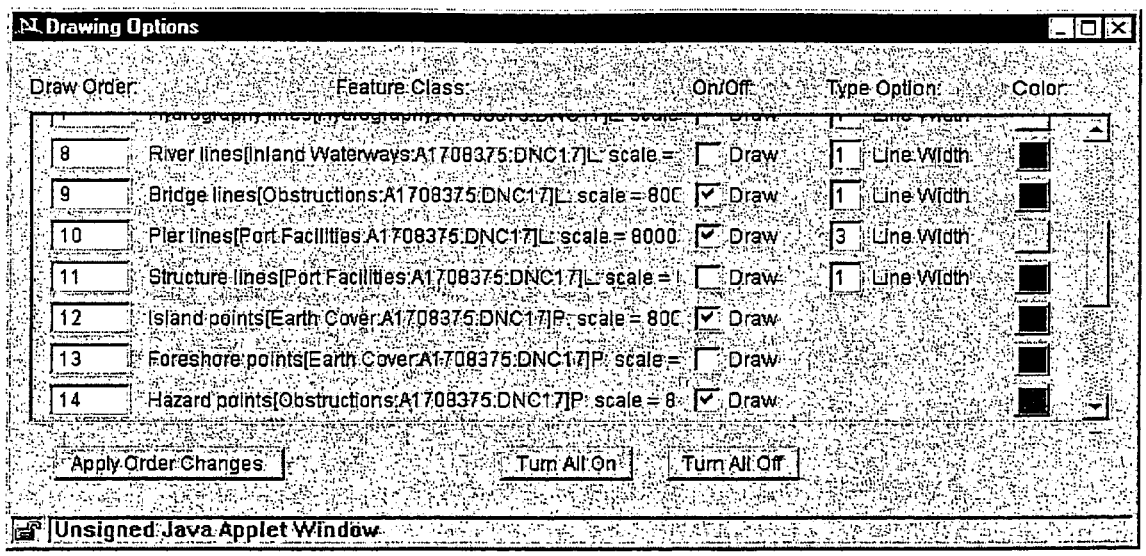
FIG. 18B shows a display screen for feature drawing options.

FIG. 18A shows a display screen for downloading "libraries", "coverages" or "features" queried and displayed on the map by selecting the download button in FIG. 10. Links to the files may be e-mailed to another over the network 46. FIG. 18B shows a display screen for allowing the user to determine what "feature" types to draw and in what order to draw them.

Update of "attributes" of a "feature" is also possible with the Web-based client applet 62. The Add Features function, which may also be implemented as an Update Feature function, initiated by clicking on the Add Feature button in FIG. 10 allows the user to choose what "features" to add or what "features" to Update (as the case may be) in the map after the map has been displayed showing the "features" selected by the user (i.e., after clicking on Display Selected Features in FIG. 9 as discussed above). For example, a newly paved road could have its "attribute" for surface type updated from "gravel" to "concrete." In a preferred embodiment, this function of the applet would be password protected so that only users with authorization can change data in the database.

With reference to FIG. 10, the user may also perform Internet queries based on the selected AOI. A user can perform an Internet query by selecting the Internet Query button, and then selecting "Weather", "News", "Yellow Pages", or "Other Maps". For example, if the user decides to find out the weather for the current AOI, upon receiving a request from the Web-based client applet 62, the server 52a will locate the nearest city to the user's AOI and will open a web page (using conventional web browsing functions) with that city's local weather forecast.

Next with reference to FIGS. 19 through 30, a function of displaying in 3-D "features" in the selected AOI and represented in the raster image of FIG. 10 will be described. The user may obtain a Virtual Reality Modeling Language (VRML) generated 3-D model of the "features" in the current AOI. One embodiment of the of the present invention uses the open standard of VRML 2.0 format for 3-D modeling of land and underwater terrain, natural "features", and man-made "features". A conventional VRML viewer (3D rendering software) executed as a browser plug-in on the computer executing a Web browser (e.g., computer 40) is used to display VRML outputs generated in server 52a. Other programing languages may be used to render 3D images, such as Java 3D Application Programming Interface (API). 3-D models are generated using gridded, Triangulated Irregular Network (TIN), and vector data.

In particular, VRML is a widely used open standard for describing and displaying 3D scenes or worlds over the Internet. The VRML format is a plain text file format that can be edited with a text editor. However, editing complex scenes containing many polygons would be extremely tedious without software designed for VRML. All of the point "features", such as street signs, coniferous trees, park benches, may be created with conventional or commercial-off-the-shelf VRML software tools or downloaded from VRML repositories on the Internet. In contrast, in the present invention the area and line "features" are created at run-time by interpreting the objects in server 52a.

Figure 19:
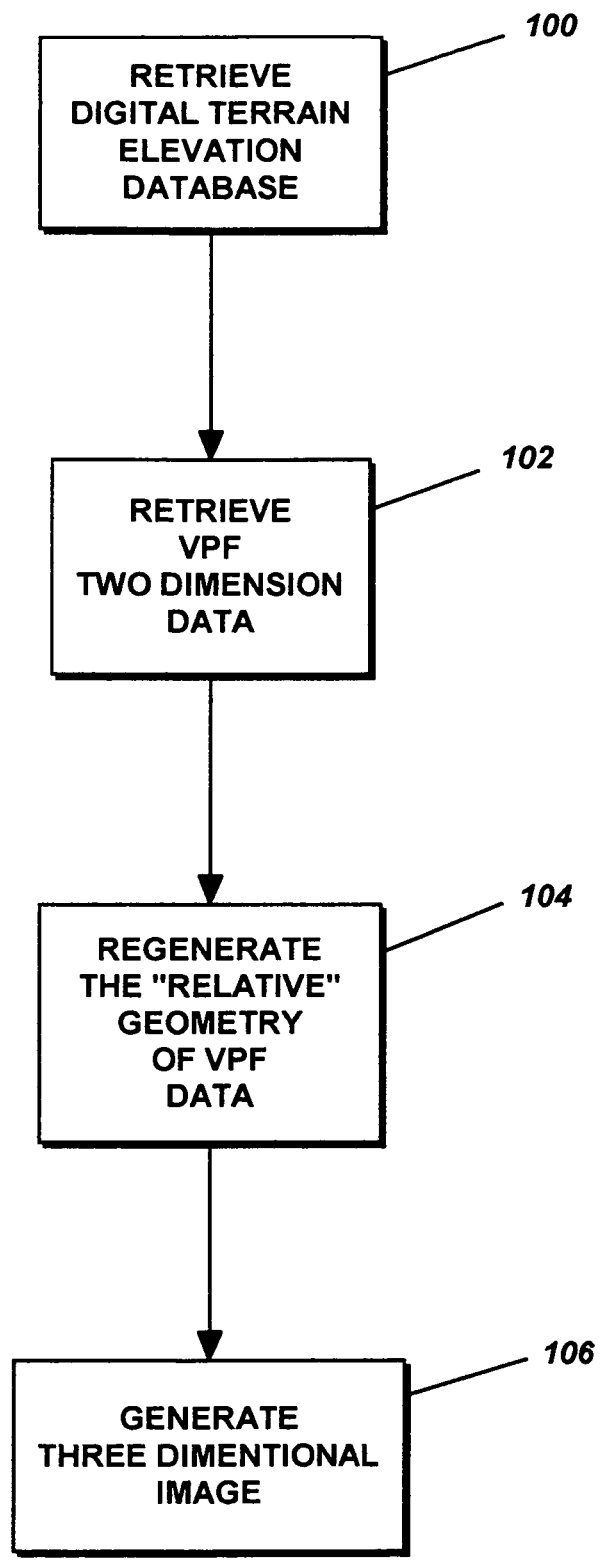
FIG. 19 is illustrating the flow of operations in the invention to support 3D display of geospatial data.

FIG. 19 illustrates the flow of operations in Web-based client applet 62 to generate 3D model of the "features" in the current AOI. The Web-based client applet 62 retrieves for point "features" information from a digital terrain elevation database at 100. Then at 102, the Web-based client applet 62 retrieves for area and line "features" two dimensional geospatial data, such as VPF, from server 52a. The Web-based client applet 62 regenerates the "relative" geometry of the two dimensional data at 104. Then, at 106 the three dimensional image is generated using the regenerated two dimensional data of 104 and the digital terrain elevation information of 100. The VRML models will provide additional information about the AOI by immersing the viewer into and allowing interaction with a virtual world.

Next the 3D modeling will be described in more detail. The 3D object "feature" classes were created in a hierarchy similar to the VPF layout. VPF has 4 basic "feature" categories: point, line, area, and text. Once the 2D "features" are converted to 3D "feature" objects, they know their state and behavior. For example, once a 2D VPF building "feature" is converted to a 3D VRML Building object "feature", then the Web-based client applet 62 can send the VRML Building object a message to output itself in VRML format. The VRML Building object inherits methods (behavior) and instance variables (state information) from its superclasses VRML Area Feature (area features) and VRML Object (base objects), as shown in FIG. 20.

Each 3D "feature" contains a reference to the objectified 2D "feature", VRML coordinates, and derived attributes. The reference to the objectified 2D feature, persisted in the OODBMS, allows for fast and easy retrieval with all the original "attributes" and location information. The VRML coordinates are calculated from the original latitude and longitude information stored with the "feature". The derived "attributes" are calculated using the original "attributes" and specific knowledge of their meanings. For example in FIG.

21, information for rendering the building roofs is derived from the Structure Shape of Roof (SSR) "attribute". Translating 2D VPF "features" to 3D VRML "features" requires some prior knowledge of the source data. For example, the source VPF data, as stored in object server 52a, was designed to be viewed on a 2D map. Further, the VPF "feature" types and "attributes" are not always consistent across source databases. FIG. 22 shows some of the mappings of VPF to VRML "features". The mappings are stored in a dictionary class and can be easily updated. Adding a bridge line to the 3D scene would require adding a key #bridge1 and value #VRMLTransLine to the dictionary. Of course, the VPF "feature" type #bridge1 would have to exist in the 2D source database. Therefore, certain code changes to the VRMLTransLine class specific to bridge line "features" may also be needed.

The coordinate information stored in the 2D objects is in latitude/longitude decimal degrees. These coordinates must be converted to the VRML coordinate system. The VRML origin is located at the north-west corner of the AOI at elevation of zero. VRML uses a Cartesian, right-handed, three-dimensional coordinate system. The standard convention is to use meters as the unit of measure with the VRML coordinate system. Transforming a location of the "feature" to the 3D world is done in several steps given that the AOI has been selected and the origin is located in the north-west corner of the AOI.

1. Calculate meters per degree for latitude and longitude using the AOI latitude
2. Calculate VRML coordinates
   Area Features:
   1. Calculate the lat/lon center of the feature's bounding box
   2. Calculate lat/lon distance of feature's center from origin and convert to VRML map coordinate
   3. Calculate the VRML coordinates of the feature's polygon.
   4. Translate the VRML polygon coordinates about the origin
   5. Build feature (generate VRML) about the origin
   6. Translate feature to location from step 2
   Line and Point Features:
   1. Calculate VRML map coordinates from feature's lat/lon coordinates
3. Return VRML node for 3D feature The above operations are associated with 102 through 106 in FIG. 19.

Many of the point "features" are constructed with the VRMLIndexFaceSet node. "Features" such as fire hydrants and trees require many faces to provide a realistic looking object. When a VRML scene contains many complex features, rendering speed can drop to levels that cause the viewing to be jerky and disorienting to the user. Rendering speeds of 10 frames per second or less are generally considered to be too slow. The VRML player (i.e., software module that generates 3D image according to FIG. 19) must render all objects within the field of view even though they may be far away. The level-of-detail (LOD) node is one way of optimizing the scene. The LOD node contains center, level, and range fields. The center field defaults to 0.0 0.0 0.0. The level field specifies a list of shape nodes for multiple definitions of the object. The range field specifies a list of viewer-to-shape distances to tell the browser when to change from one LOD to another. The ranges are listed in increasing values where the first distance indicates the highest LOD, first node in the level field list. For example, the LOD node in FIG. 23 describes 3 levels of detail for the fire hydrant point "feature". The first level "FireHydrant1.wrl" contains a complex IndexFaceSet node version that will be displayed when the viewer is within 100 meters. The second level "FireHydrant2.wrl" contains a simple Cylinder node version that will be displayed in the 100–200 meter range. (FIG. 24). The third level is an empty Group node that displays no representation beyond 200 meters. Using LOD nodes provides a way to provide both high realism and performance.

Some of the most difficult problems in generating realistic VRML scenes come from a lack of complete shape information. VPF building area "features", for example, may not include enough information to accurately recreate the buildings as they actually appear. For example, building "attributes" from the VPF data set include height, foot print polygon, function category, roof type, and a few others. Further, building roofs have one "attribute" (i.e., SSR). As discussed above, SSR has values of flat or pitched. Therefore, 2D data may not be good choice for 3D rendering but desirable to use because of ample available data. Although, flat roofs may be easily rendered in 3D, pitched roofs pose more complex problems because the buildings may be curved or have a complex shape. A solution in the present invention for constructing building and pitched roofs on a non-rectangular building is to use an Extrusion node. The Extrusion node has a scale field that defines a list of scale-factor pairs for each point along the spine. The scale values from 1.0 to 0.0 decrease the objects scale with 1.0 leaving the object unchanged. Scale values greater than one increase the size of the object. The roof Extrusion was scaled from 1.0 to 0.0 giving the roof a gradual slant up to the apex (FIG. 25).

Rendering line "features" such as roads and rivers also presents some problems. Many of the road "features" are sometimes finely segmented into separate "features" in VPF, which causes problems when converting and rendering in 3D. In particular, conventional 3D rendering software may have difficulty when drawing Extrusions, as used for line "features", that have single segment spines that are extruded along the ground. The road Extrusions may not lie flat in such cases. One solution in the present invention is to combine single segment road "features" with adjacent road "features" that share a node. After selectively processing and combining the line "features", the roads render flat on the ground. Further, road edges from segment to segment along the spine were smooth out.

Next, with reference to FIGS. 4A, 4B, 5A, 5B and 26 through 30, software system in local client server computer 42 will be described. In particular, software system of local client server computer 42 has the dual function of server and client, according to operations performed or requested, thereby causing computer 42 to act as a client server in relation to master server computer 44 or as a local server in relation to Browser client computers 40.

Figure 26:
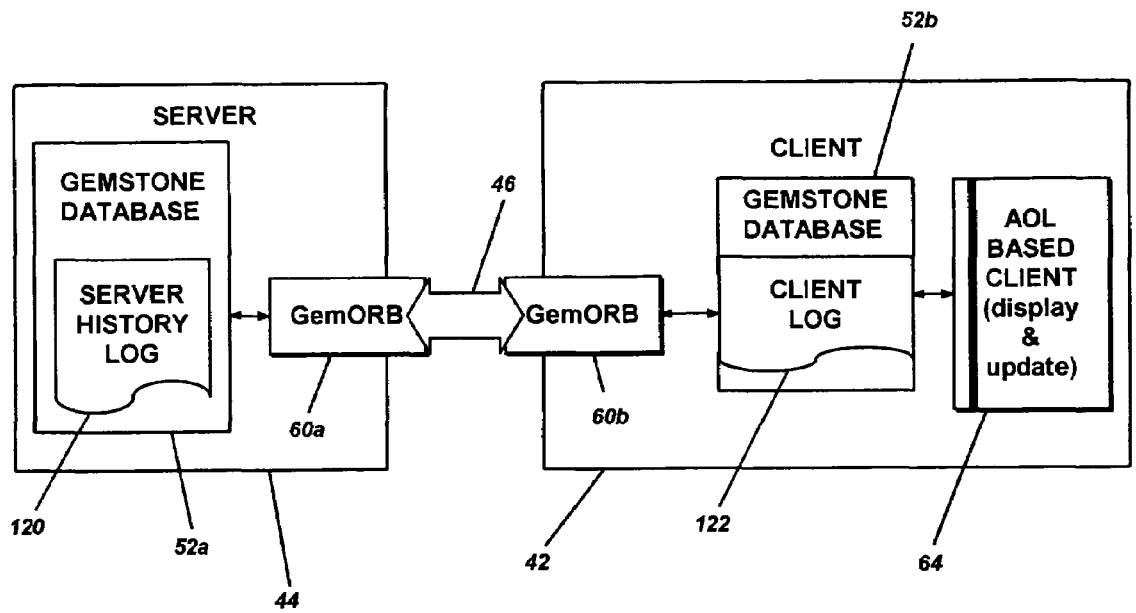
FIG. 26 depicts a block diagram of software system to update the object-oriented geospatial database of the invention in the client/server system in FIG. 1.

For information distribution from a GIDS server, such as master server 44 or local client server 42, to a GIDS client, such as Browser client 40, both the server database application 52a and the client database application 52b as shown in FIGS. 4A, 4B and 26 may be identical. Further, Web-based applet 64 in local client server computer 42 acting as local server or local client server, and Web-based applet 62 in Browser client 40 may be identical. A peer-to-peer system configuration for CORBA has been implemented. A well-defined set of methods in an IDL file is used between systems to query and retrieve objects. Any system can become a server and client based on the needs.

A role of server and client is based on the role a GIDS system assumes. A GIDS system can be a server to a suite of clients for a certain type of data set. However, the same GIDB system can be a client server in relation to some other server for another data set. This capability demonstrates a "smart client pull" information flow, which is described below.

1. A server computer 44 is up and running continuously. Client computers 42 are on-line as needed.

Figure 27:
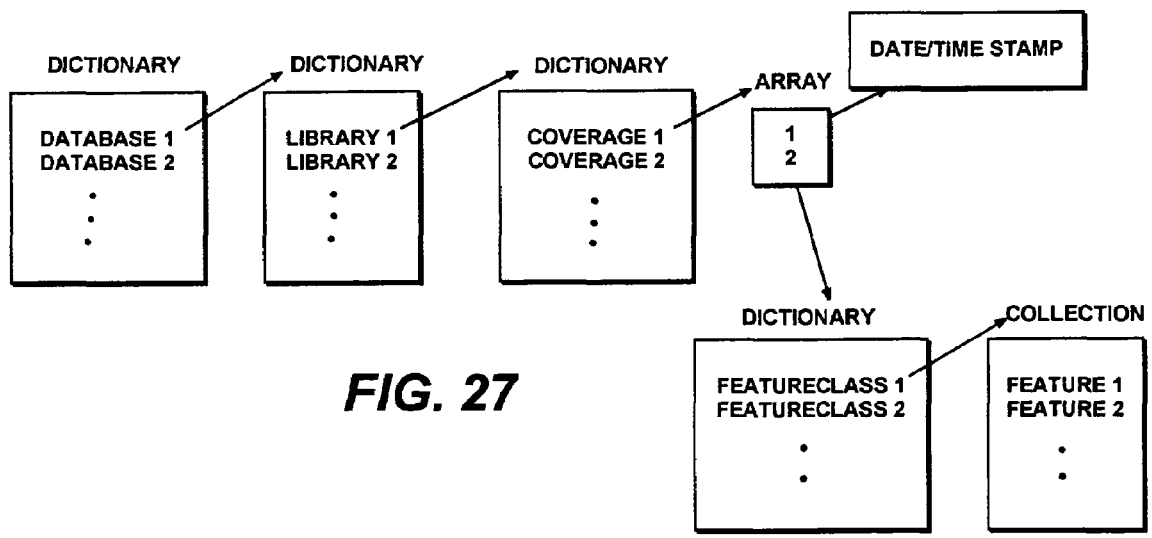
FIG. 27 shows the format of server history log in a local client server or master server in the client/server system in FIG. 1.

2. Both database server 52a and client server 52b maintain a log. The database server 52a maintains an update server history log 120. The client server 52b maintains a client history log 122. These are represented in FIG. 27.

3. A client initiates an update check. When a user logs onto the Gemstone server 52b (via Browser client 40), a request is sent to the server 52a via ORB-to-ORB communication (i.e., interface system 60a, 60b or 60 in case firewall 70 exists) to check for any update. A check, on whether client server 52b needs an update, from server's 52b client history log 122 is based on a time stamp and the state of the "feature" in terms of its location and "attributes".

This "smart client pull" allows a background processing to automatically update the changes from the selected server. Therefore, an interactive processing from the user is not required to initiate the update. It is also possible to have no user interaction for the actual update process; the system could be set up to automatically update the changes based on well-defined criteria.

The GIDS server 52a records all updates in server history log 120. The server history log 120 is maintained as a class variable to VPFDatabase and can be viewed by inspecting "VPFDatabase historyLog". The format of server history log 120 is shown in FIG. 27. When a "feature" is updated, an instance of a CORBA VectorFeature as defined in the IDL file is created and added to the appropriate feature collection in server history log 120. The "coverage" date/time stamp in server history log 120 is changed to reflect the date/time that this "feature" was updated. Thus, the "coverage" date/time stamp reflects the date/time of the most recent update that has occurred within the "coverage".

Figure 28:
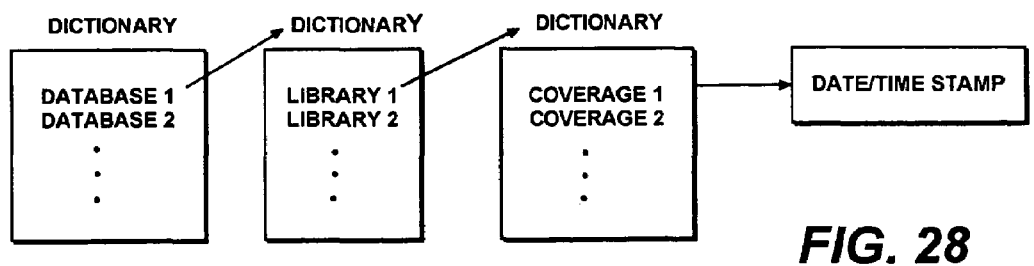
FIG. 28 show the format of a client history log in a local client server in the client/server system in FIG. 1.

When a client server, such as client server 52b, receives updates from another server, such as server 52a, all updates are recorded in client history log 122 as described above regarding server history log 120. In so doing, this client can then be a server to another client. Therefore, in addition to recording the updates in server history log 120, a client server also keeps a record of the updates in a client history log 122. The client history log 122 is maintained as a class variable to VPFDatabase and can be viewed by inspecting 'VPFDatabase clientHistoryLog'. The format of the client history log 122 is shown in FIG. 28. The client history log 122 records the date/time of the latest update for each "coverage" from another server. It is used to determine whether any updates have occurred since the last time the client server was updated by another server.

Figure 29:
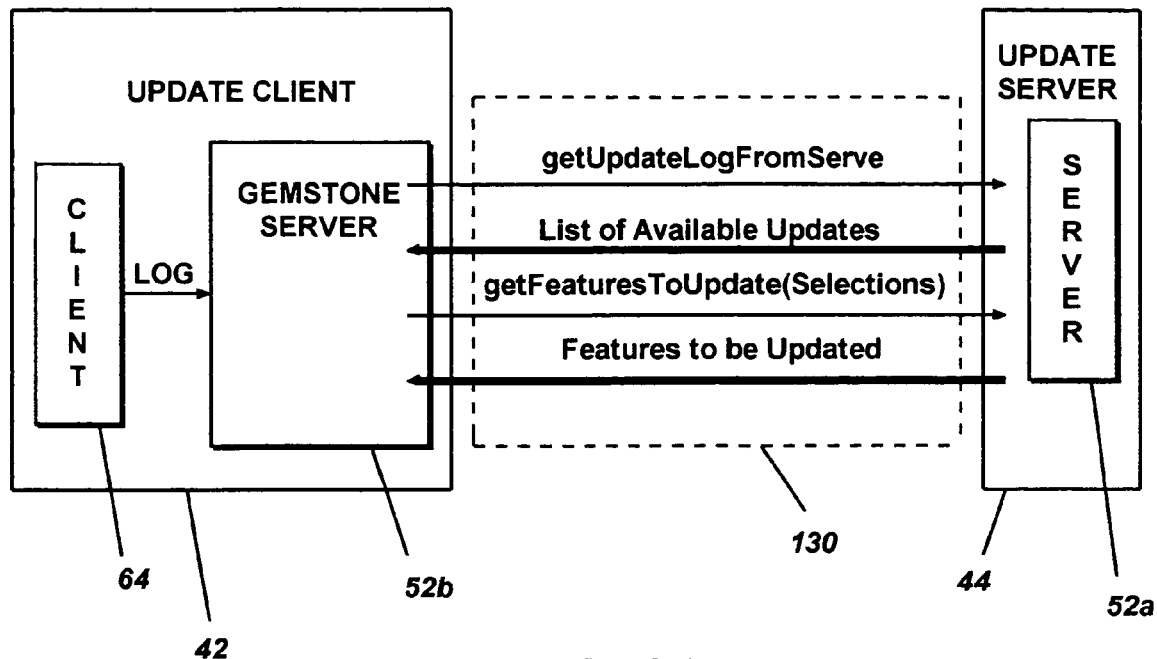
FIG. 29 shows the application level protocol between the local client server and another local client server or master server for receiving available updates from the other local client server or master server (as the case may be) in the client/server system in FIG. 1.
Figure 30:
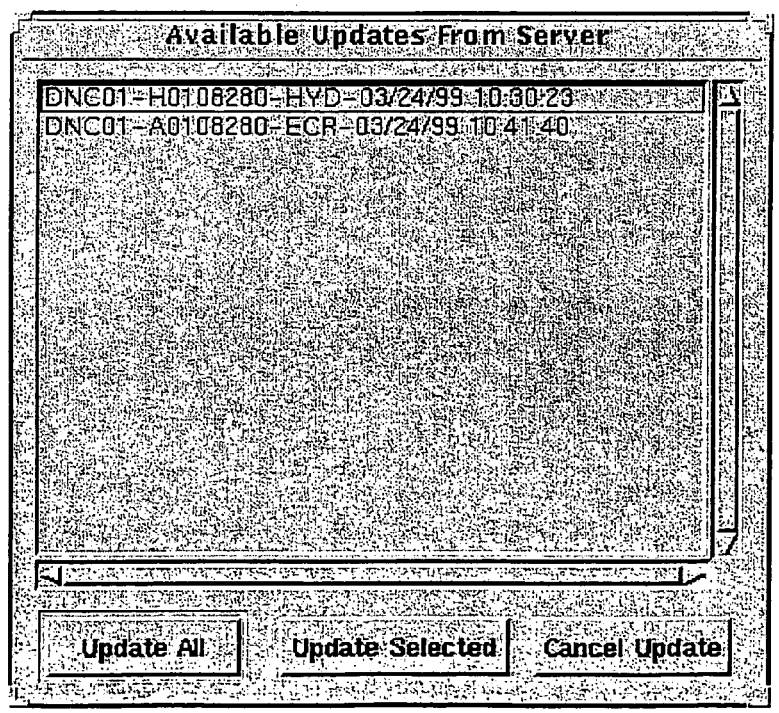
FIG. 30 shows a display screen in the local client server for receiving available updates from another local client server or master server in the client/server system in FIG. 1.

With reference to FIG. 29, the application level protocol 130 implementing database update over the network will be described. When client server 52b in client server 42 logs on, the system automatically sends a CORBA request to server 52a for a list of available updates. During the login, the server 52b invokes the server-side method getUpdateLogFromServer. This server-side method checks the server 52a server history log 120 for updates. A list of strings comprised of "database", "library", and "coverage" names with time stamps, such as 'db1-lib1-cov1-01/27/99 13:37:37', is returned to server 52b. The server 52b code then compares time stamps from the returned list of available updates with time stamps from the client history log 122 to determine if the updates are needed on server 52b. If server 52b does need to be updated, a window appears (as the case may be) allowing the user to select which updates to perform, as shown in FIG. 30.

The user may choose to update all, some, or none of the "coverages". The items selected for update are then added to client history log 122. As an item is being added to client history log 122, log 122 is checked to determine if the "coverage" has been updated previously. If so, the time stamp for that "coverage" is updated, and the server 52a time stamp is replaced with the previous update time stamp. If not, the server 52a time stamp is replaced with the word "none". The time stamp replacement is used to prevent the server 52a from sending back "features" that have already been updated. After the client history log 122 is changed, the server-side 52b method getFeaturesToUpdate: updateSelections is invoked (i.e., a CORBA request is sent to server 52a).

For each item in the updateSelections list, the server 52a finds the collection of updated "features" for the selected "coverage". If the item in the updateSelections list has "none" in place of its time stamp, then all of the "features" for this "coverage" are placed in the set of "features" to be updated. Otherwise, the time stamp from the updateSelections list "coverage" is compared to the time stamp of each "feature" in server 52a. If the "feature" in the server 52a was updated at a later date and time than the "coverage" from server 52b, then the "feature" is added to the set of "features" to be updated. This set of "features" to be updated is then returned to the server 52b.

When server 52b in client server computer 42 receives the set of "features" to be updated, each "feature" in the set is updated. If the changeType is ADD, then a new "feature" is created based on the parameters of the VectorFeature. Otherwise, the local client server 52b feature which matches the VectorFeature to be changed, deleted, or moved must be found in server 52b. The local client server 52b "feature" is found by using the VectorFeature featname and identifier (id). The oldAttributes and oldCoords are then compared with the local client server 52b feature to verify that the VectorFeature and the local client feature are indeed the same.

There may be two potential sources for conflict in the search for a match. First, a server 52b may have locally updated the "feature". Since all GIDS systems have a capability to update "feature" data, a local update could have potentially taken place. A local update has precedence over the network update. Secondly, a "feature" can be uniquely identified by its "database", "library", "coverage", "feature" class, and id. NIMA distributes its data with an additional identifier, an edition number. The latest edition will be a superset of all changes from the previous editions. The changes from one edition to another may coincide with the changes in client history log 122. However, the changes that take place by NIMA and the changes via GIDS may be an independent effort. Because the edition numbers might not be maintained by GIDS (assumed to have the latest released edition), there may be a mismatch in the edition of the server 52a and client server 52b. Therefore, using the VectorFeature featname and identifier (id) may not uniquely identify a feature. If the VectorFeature cannot be verified as a match to a local client feature, then the update for the VectorFeature will not occur.

When the "feature" has been validated, the local client server 52b "feature" is then changed, deleted, or moved based on the parameters of the VectorFeature. As discussed above, client history log 122 will be modified to reflect these updates from server 52a.

The object-oriented geospatial database system (i.e., GIDS) of the present invention allows users interested in a wide variety of mapping data to access and benefit from the GIDS over the Internet from any platform using a Web-enabled web browser. This allows the functionality of more powerful server machines to be exhibited on less capable client machines. This also gives users faster access to mapping data. The migration to a Web-based mapping client is advantageous by allowing clients with modest computing resources user-friendly access to state-of-the-art mapping data and software. Given an AOI, the GIDS provides multiple mapping data types for that region to the user for visualization (2D or 3D) and analysis. Further, with data-driven query capabilities over the network, data dissemination will be near-real-time or real-time (as the case may be) over the network. In summary, the GIDS fulfills a much needed requirement to provide mapping data of multiple types in an AOI to user in near-real-time or real-time (as the case may be) over a network, such as WWW.

Current alternative geospatial data systems obtain discrete data via CD-ROM or other media to then load the data into various software packages to individually generate 3D views, perform GIS queries, and perform other functionalities. There is no unified approach available.

The many features and advantages of the present invention are apparent from the detailed specification and thus, it is intended by the appended claims to cover all such features and advantages of the system which fall within the true spirit and scope of the invention. Further, numerous modifications and changes will readily occur to those skilled in the art from the disclosure of this invention. It is not desired to limit the invention to the exact construction and operation illustrated and described; accordingly, suitable modification and equivalents may be resorted to, as falling within the scope and spirit of the invention.

What is claimed is:

1. A method of building and maintaining an object-oriented spatial database of worldwide geospatial data from at least two or more data formats, the method comprising:
    instantiating objects of the object-oriented database, using at least two of Vector Product Format (VPF), Raster Product Format (RPF), Text Product Standard (TPS), Environmental System Research Institute (ESRI) shape, Generic Sensor Format (GSF), Naval Oceanographic Office text (NAVOCEANO), and temporal information databases;
    initializing spatial and non-spatial feature data of the object-oriented database;
    spatially indexing data among objects from the at least two VPF, RPF, TPS, ESRI, GSF, NAVOCEANO and temporal information databases into the single, object-oriented spatial database;
    receiving from a client computer in the database network an area of interest from a visual image, representing active data objects, displayed on a computer on the network;
    identifying to the client computer data available for the area of interest;
    responsive to a request for the data, querying over the network data objects in at least one database associated with the area of interest;
    receiving from at least one remote computer over the network data objects in the at least one database associated with the area of interest and creating an object-oriented database of geospatial data using object models;
    transmitting a web-based applet to the client computer for viewing the data objects overlaid on a map display; and
    converting two dimensional data objects to three dimensional data objects and displaying the converted three dimensional data objects,
    wherein a three dimensional image is generated using digital terrain elevation data from an object oriented database on a remote computer and two dimensional feature data stored on a server and retrieved by the applet.

2. A method of distributing in real-time geospatial data over a object oriented spatial database network connecting together computers, the method comprising:
    receiving from a client computer in the database network an area of interest from a visual image, representing active data objects, displayed on a computer on the network;
    identifying data available for the area of interest;
    responsive to a request for the data, querying over the network data objects in at least one database associated with the area of interest;
    receiving from at least one remote computer over the network data objects in the database associated with the area of interest and creating an object-oriented database of geospatial data using object models;
    transmitting a web-based applet to the client computer for viewing the data objects overlaid on a map display; and
    converting two dimensional data objects to three dimensional data objects using gridded, triangulated irregular network, and vector data and displaying the converted three dimensional data objects.

3. The method according to claim 2, wherein the geospatial data includes temporal information.

4. The method according to claim 2, wherein the data objects are displayed in three dimensions.

5. The method according to claim 2, wherein the querying is performed using an interface system conforming to Common Object Request Broker Architecture.

6. The method of distributing in real-time geospatial data over a network according to claim 2, wherein the querying includes receiving database, library, theme and features as data objects.

7. The method according to claim 2, wherein said applet allows a user at the client computer to view the data objects overlaid on the map display without downloading the database from the remote computer.

8. The method according to claim 2, further comprising creating an object-oriented database of geospatial data associated with the area of interest responsive to receiving the area of interest.

9. The method according to claim 8, further comprising storing the object-oriented database on a storage unit connected to the network without downloading the database to the client computer.

10. The method according to claim 2, further comprising an object request broker interfacing between the applet and a server, the applet executing on the client computer.

11. The method according to claim 2, wherein at least one of the object oriented databases includes data from environmental sensors.

12. The method according to claim 2, wherein at least one of the object oriented databases includes temporal weather information.

13. The method according to claim 2, wherein said area of interest is selected by a user at the client computer from a world map display.

14. The method according to claim 2, further comprising:
designing object models for the geospatial data including two or more disparate data formats; and
storing the object-oriented database on a storage unit connected to the network.

15. The method according to claim 2, further comprising, responsive to a request from the client computer:
locating a nearest city to the area of interest and opening a web page with the local weather forecast for the nearest city.

16. A method of distributing in real-time geospatial data over a object oriented spatial database network connecting together computers, the method comprising:
receiving from a client computer in the database network an area of interest from a visual image, representing active data objects, displayed on a computer on the network;
identifying data available for the area of interest;
responsive to a request for the data, querying over the network data objects in at least one database associated with the area of interest;
receiving from at least one remote computer over the network data objects in the database associated with the area of interest and creating an object-oriented database of geospatial data using object models;
transmitting a web-based applet to the client computer for viewing the data objects overlaid on a map display; and
converting two dimensional data objects to three dimensional data objects and displaying the converted three dimensional data objects,
wherein a three dimensional image is generated using digital terrain elevation data from an object oriented database on a remote computer and two dimensional feature data stored on a server and retrieved by the applet.

17. The method of claim 16, wherein the geospatial data includes temporal information.

18. The method of claim 16, wherein the data objects are displayed in three dimensions.

19. The method of claim 16, wherein the querying is performed using an interface system conforming to Common Object Request Broker Architecture.

20. The method of distributing in real-time geospatial data over a network according to claim 16, wherein the querying includes receiving database, library, theme and features as data objects.

21. The method according to claim 16, wherein said applet allows a user at the client computer to view the data objects overlaid on the map display without downloading the database from the remote computer.

22. The method according to claim 16, further comprising creating an object-oriented database of geospatial data associated with the area of interest responsive to receiving the area of interest.

23. The method according to claim 22, further comprising storing the object-oriented database on a storage unit connected to the network without downloading the database to the client computer.

24. The method according to claim 16, further comprising an object request broker interfacing between the applet and a server, the applet executing on the client computer.

25. The method according to claim 16, wherein at least one of the object oriented databases includes data from environmental sensors.

26. The method according to claim 16, wherein at least one of the object oriented databases includes temporal weather information.

27. The method according to claim 16, wherein said area of interest is selected by a user at the client computer from a world map display.

28. The method according to claim 16, further comprising:
designing object models for the geospatial data including two or more disparate data formats; and
storing the object-oriented database on a storage unit connected to the network.

29. The method according to claim 16, further comprising, responsive to a request from the client computer:
locating a nearest city to the area of interest and opening a web page with the local weather forecast for the nearest city.

30. A method of building and maintaining an object-oriented spatial database of worldwide geospatial data from at least two or more data formats, the method comprising:
instantiating objects of the object-oriented database, using at least two of Vector Product Format (VPF), Raster Product Format (RPF), Text Product Standard (TPS), Environmental Systems Research Institute (ESRI) shape, Generic Sensor Format (GSF), Naval Oceanographic Office text (NAVOCEANO), and temporal information databases;
initializing spatial and non-spatial feature data of the object-oriented database;
spatially indexing data among objects from the at least two VPF, RPF, TPS, ESI, GSF, NAVOCEANO and temporal information databases into the single, object-oriented spatial database;
receiving from a client computer in the database network an area of interest from a visual image, representing active data objects, displayed on a computer on the network;
identifying to the client computer data available for the area of interest;
responsive to a request for the data, querying over the network data objects in at least one database associated with the area of interest;
receiving from at least one remote computer over the network data objects in the at least one database associated with the area of interest and creating an object-oriented database of geospatial data using object models;
converting two dimensional data objects to three dimensional data objects using gridded, triangulated irregular network, and vector data; and
transmitting a web-based applet to the client computer for viewing the data objects overlaid on a map display.

* * * * *